United States Patent
Page et al.

(10) Patent No.: US 11,107,147 B2
(45) Date of Patent: Aug. 31, 2021

(54) SYSTEMS AND METHODS FOR END-TO-END ARTICLE MANAGEMENT

(71) Applicant: The North Face Apparel Corp., Wilmington, DE (US)

(72) Inventors: Graham Page, Alameda, CA (US); Anthony Perez, Foster City, CA (US); Angelique Dietz, Alameda, CA (US); Charles Rogers, Durham, NC (US); Abolfazl Aghanouri, Alameda, CA (US); Subra Goparaju, Greensboro, NC (US); Demitri Balabanov, Greensboro, NC (US)

(73) Assignee: The North Face Apparel Corp., Wilmington, DE (US)

( * ) Notice: Subject to any disclaimer, the term of this patent is extended or adjusted under 35 U.S.C. 154(b) by 0 days.

(21) Appl. No.: 16/684,489

(22) Filed: Nov. 14, 2019

(65) Prior Publication Data

US 2020/0157723 A1    May 21, 2020

Related U.S. Application Data

(60) Provisional application No. 62/768,506, filed on Nov. 16, 2018.

(51) Int. Cl.
*D06B 1/04*    (2006.01)
*D06C 27/00*    (2006.01)
(Continued)

(52) U.S. Cl.
CPC .......... *G06Q 30/0633* (2013.01); *D06B 1/04* (2013.01); *D06C 27/00* (2013.01); *D06H 3/02* (2013.01);
(Continued)

(58) Field of Classification Search
CPC .......... D06C 27/00; D06M 10/02; D06P 7/00; D06H 3/02; D06H 7/221; G05B 19/182;
(Continued)

(56) References Cited

U.S. PATENT DOCUMENTS 6,705,717 B1 *   3/2004   Fujita ................... B41J 2/14024
                                                          347/100
8,838,482 B2    9/2014   Schindler et al.
(Continued)

FOREIGN PATENT DOCUMENTS

WO    2020/102553 A2    5/2020
WO    2020/102557 A1    5/2020
WO    2020/102567 A1    5/2020

OTHER PUBLICATIONS

US application filed Nov. 14, 2019 entitled, Systems and Methods for End-To-End Article Management, U.S. Appl. No. 16/684,456.
(Continued)

*Primary Examiner* — Thomas C Lee
*Assistant Examiner* — Charles Cai
(74) *Attorney, Agent, or Firm* — Smith, Gambrell & Russell LLP

(57) ABSTRACT

Systems and methods are described for managing articles. The systems and methods described herein may comprise an example method for manufacturing an article. The systems and methods described herein may comprise an example method for cutting and registration of an article. The systems and methods provides an end-to-end manufacturing value chain as a closed system and feedback loop.

17 Claims, 27 Drawing Sheets

(51) Int. Cl.
    *D06M 10/02* (2006.01)
    *G05B 19/418* (2006.01)
    *G06Q 50/04* (2012.01)
    *D06H 3/02* (2006.01)
    *D06P 7/00* (2006.01)
    *G05B 19/18* (2006.01)
    *D06H 7/22* (2006.01)
    *G06Q 30/06* (2012.01)
    *G06K 19/06* (2006.01)
    *G06Q 10/08* (2012.01)

(52) U.S. Cl.
    CPC .............. *D06M 10/02* (2013.01); *D06P 7/00* (2013.01); *G05B 19/182* (2013.01); *G05B 19/41865* (2013.01); *G06K 19/06037* (2013.01); *G06Q 10/0875* (2013.01); *G06Q 30/0621* (2013.01); *G06Q 50/04* (2013.01); *D06H 7/221* (2013.01); *D10B 2401/021* (2013.01); *G05B 2219/36199* (2013.01); *G05B 2219/45196* (2013.01)

(58) Field of Classification Search
    CPC ........... G05B 2219/36199; G05B 2219/45196; D10B 2401/021; D06B 1/04
    See application file for complete search history.

(56) References Cited

U.S. PATENT DOCUMENTS

| | | |
|---|---|---|
| 9,230,231 B1 | 1/2016 | Hodges |
| 9,782,906 B1* | 10/2017 | Aminpour .............. B26D 5/005 |
| 2003/0139840 A1 | 7/2003 | Magee et al. |
| 2004/0038605 A1* | 2/2004 | Hooper .................. D06B 21/00 442/59 |
| 2005/0278058 A1 | 12/2005 | Panebianco |
| 2011/0033691 A1 | 2/2011 | Craamer et al. |
| 2012/0148326 A1* | 6/2012 | Ipponyari .............. B26D 1/045 400/621 |
| 2014/0176629 A1 | 6/2014 | Buschmann |
| 2014/0277663 A1 | 9/2014 | Gupta et al. |
| 2015/0107033 A1 | 4/2015 | Chang et al. |
| 2016/0202691 A1 | 7/2016 | Pettersson et al. |
| 2017/0131703 A1 | 5/2017 | Gordon et al. |
| 2017/0139379 A1 | 5/2017 | Scheckelhoff |
| 2017/0157902 A1* | 6/2017 | Blackford ............ A41D 31/102 |
| 2017/0208217 A1 | 7/2017 | Soriano et al. |
| 2017/0347753 A1* | 12/2017 | Kilgore ................ A43B 23/042 |
| 2017/0351246 A1 | 12/2017 | Colaianni et al. |
| 2019/0125022 A1 | 5/2019 | George |
| 2019/0255873 A1* | 8/2019 | O'Donnell ............. B42D 25/22 |
| 2019/0299338 A1* | 10/2019 | Weedlun ............ B23K 26/0344 |
| 2020/0157722 A1 | 5/2020 | Page et al. |
| 2020/0160424 A1 | 5/2020 | Page et al. |

OTHER PUBLICATIONS

US application filed Nov. 14, 2019 entitled, Systems and Methods for End-To-End Article Management, U.S. Appl. No. 16/684,478.

Kan et al., "Using atmospheric pressure plasma for enhancing the deposition of printing paste on cotton fabric for digital ink-jet printing", Cellulose, Kluwer Academic Publishers (Dordrecht), NL, vol. 18, No. 3, Feb. 27, 2011, pp. 827-839.

* cited by examiner

FABRIC    Cotton Duck, Re-scoured on Jig       pH = 7.1, % Alk = 0.05% (as NaOH)
          210 g/m² (6.2 oz/yd²)

FOAM CONDITIONS: Foam Face using Bottom Head #2 (Face down)

| Back Finish (Foam) | 2B & 2D | 3C | 5B |
|---|---|---|---|
| | | g/kg | |
| Water | 770 | 690 | 585 |
| Urea | 100 | 100 | 150 |
| Sodium Carbonate | 20 | 20 | 30 |
| Thermacol MP | - | - | - |
| Prepajet UNI | 80 | 80 | 120 |
| Lyoprint RG | 20 | - | - |
| Sodium Chloride | - | 100 | 100 |
| Unifroth 3069 | 10 | 10 | 15 |

| Desired % W Sample ID | Weight grams/m² | Speed m/min | Pump Output liters/min | Blow Ratio | Mixer Speed | Back Press, psi | Applicator Press, psi | Hose Dia. inches | Brake psi | Comments |
|---|---|---|---|---|---|---|---|---|---|---|
| 20.0 2B | 210 | 5.5 | 0.100 | 10:1 | 30% | 43 | 3.8 | 1/4 | 5-6 | Even |
| 20.0 2D | 210 | 5.5 | 0.100 | 12:1 | 30% | 46 | 3.8 | 1/4 | 5-6 | Even |
| 40.0 3C | 210 | 2.7 | 0.100 | 7:1 | 30% | 39 | 4.2 | 1/4 | 5 | Good! |
| 30.0 5B | 210 | 3.6 | 0.100 | 7:1 | 30% | 49 | 6.9 | 1/4 | 10 | Good. |

FIG. 7B

Polyester Pretreatment formulation:
- Demineralized water
- 200 g/l Zelan R3
- 10 g/l Unifroth 3069 (foaming agent)

| Foam parameters | Main Liquid Flow (lit/min) | Blow ratio | Mixer Speed (%) | Line speed (YPM) | Mixer foam back pressure (PSI) |
|---|---|---|---|---|---|
| | 1.3 | 10 | 50 | 15 | 24 |

Water/energy saved in comparison with pad process (80% wet pickup)= ~75% with current foam parameter, it is possible to improve it to 80%-85%

Chemistry saved in comparison with pad process (80% wet pickup)= ~25 % with current foam parameter, it is possible to improve it to 50%

FIG. 7C

SYSTEMS AND METHODS FOR END-TO-END ARTICLE MANAGEMENT

CROSS-REFERENCE TO RELATED APPLICATIONS

This application claims priority to and the benefit of U.S. Patent Application No. 62/768,506 filed Nov. 16, 2018, which is hereby incorporated by reference in their entirety.

BACKGROUND

Traditional fabric manufacturing processes may take a long time from conception of an article of clothing to production of the article of clothing. However, changes in consumer clothing trends may occur quickly. Additionally, changes in manufacturing parameters, such as resources available, may affect whether a particular article of clothing may be created. By the time a manufacturing process has changed which articles of clothing are manufactured to adapt to a new trend and account for the available resources, another new clothing trend may emerge. What is needed is a fabric manufacturing process that may more efficiently adapt to changing trends and real-time manufacturing parameters.

SUMMARY

The present disclosure relates, in one or more aspects, to an end-to-end process for article management. Such articles may comprise clothing, apparel, accessories, components comprising fabrics, and the like. The present disclosure relates, in one or more aspects, to producing an article within tolerance of the design for such article. Often, in conventional processes, the steps of article management are discrete and disjunctive, with transitions between steps of the process introducing error or discrepancies from intended design. The end-to-end processes of the present disclosure may minimize such discrepancies and may facilitate the production of articles such as apparel to within tight tolerances of the intended design. In particular, color of a finished article may be within a predetermined tolerance of the designed color. Alternatively or additionally, the methods and systems of the present disclosure may facilitate dynamic pricing, dynamic lead time, dynamic batching, dynamic delivery, and may provide a personalized or customized process for customers.

Conventional methods are locked into long forecast-driven supply chains. The present disclosure provides a demand driven apparel manufacturing process by moving process steps such as coloration closer to the consumer.

Systems and methods are described for managing material such as fabric manufacturing. The systems and methods described herein may comprise an example method for manufacturing an article. The example method may comprise receiving consumer data comprising at least biometric information associated with one or more consumers. The example method may comprise receiving design inputs indicative of a design of an article, wherein the design of the article is based on the consumer data. The example method may comprise causing output of interactive content to a user interface associated with the one or more consumers, wherein the interactive content comprises at least a representation of the design of the article. The example method may comprise outputting manufacturing data indicative of instructions associated with manufacture of the article, wherein the instructions are based on the design of the article. These and other fabric manufacturing management methods and systems are described herein.

BRIEF DESCRIPTION OF THE DRAWINGS

The following drawings show generally, by way of example, but not by way of limitation, various examples discussed in the present disclosure. In the drawings:

FIG. 7B illustrates a formulation of an example treatment.
FIG. 7C illustrates a formulation of an example treatment.

DETAILED DESCRIPTION

Systems and methods are described for managing articles such as clothing/apparel including but not limited to, shirts, pants, shorts, footwear, and bags, for example only. The systems and/or methods may comprise end-to-end article management such as manufacturing. The systems and/or methods may comprise every manufacturing aspect from a design of an article of clothing to delivery of the article of clothing to a customer. The systems and/or methods may capture information from one or more steps of a management or manufacturing process to influence other steps of the management or manufacturing process. Reference may be made herein to fabric or textiles as an illustration. However, application to a broader range of materials is contemplated and thus should not be limited to such illustrative terms.

The systems and/or methods described herein may comprise one or more tools, units, or plants for managing articles such as apparel or clothing from fabric to customer. The systems and/or methods described herein may comprise one or more clothing manufacturing plants. The systems and/or methods described herein may comprise one or more computing devices associated with the one or more clothing manufacturing plants associated with one or more respective clothing manufacturers. The systems and/or methods described herein may comprise one or more cloud computing environments associated with the one or more clothing manufacturing plants. The systems and/or methods described herein may comprise one or more client devices, such as laptops, desktops, smart phones, wearable devices, tablets, etc. The one or more client devices may be in communication with the one or more computing devices and/or the one or more cloud computing environments via a network. The one or more client devices may comprise one or more applications executing on the one or more client devices.

Figure 1A:
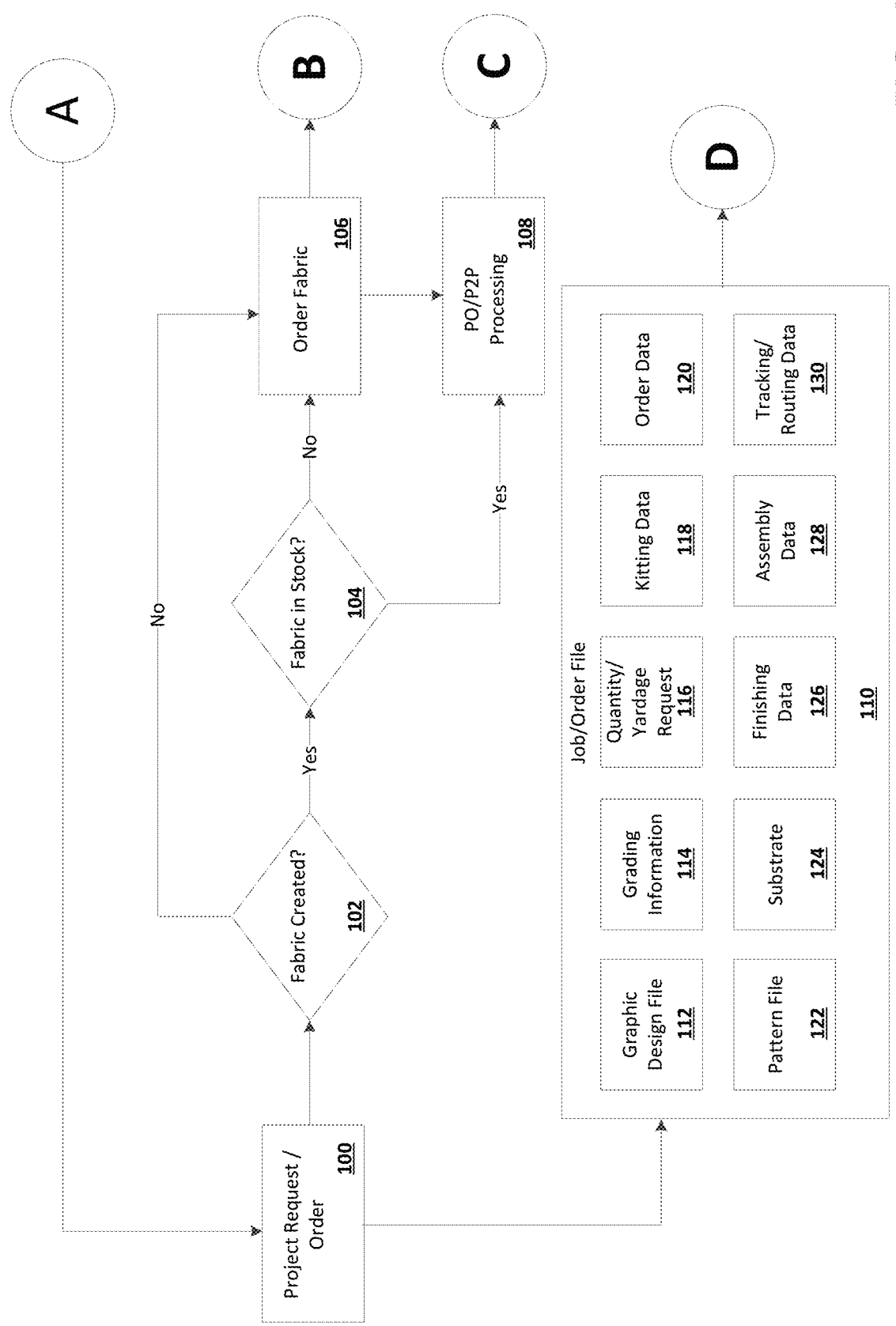
FIGS. 1A-1E show an example diagram of a manufacturing process.
Figure 1B:
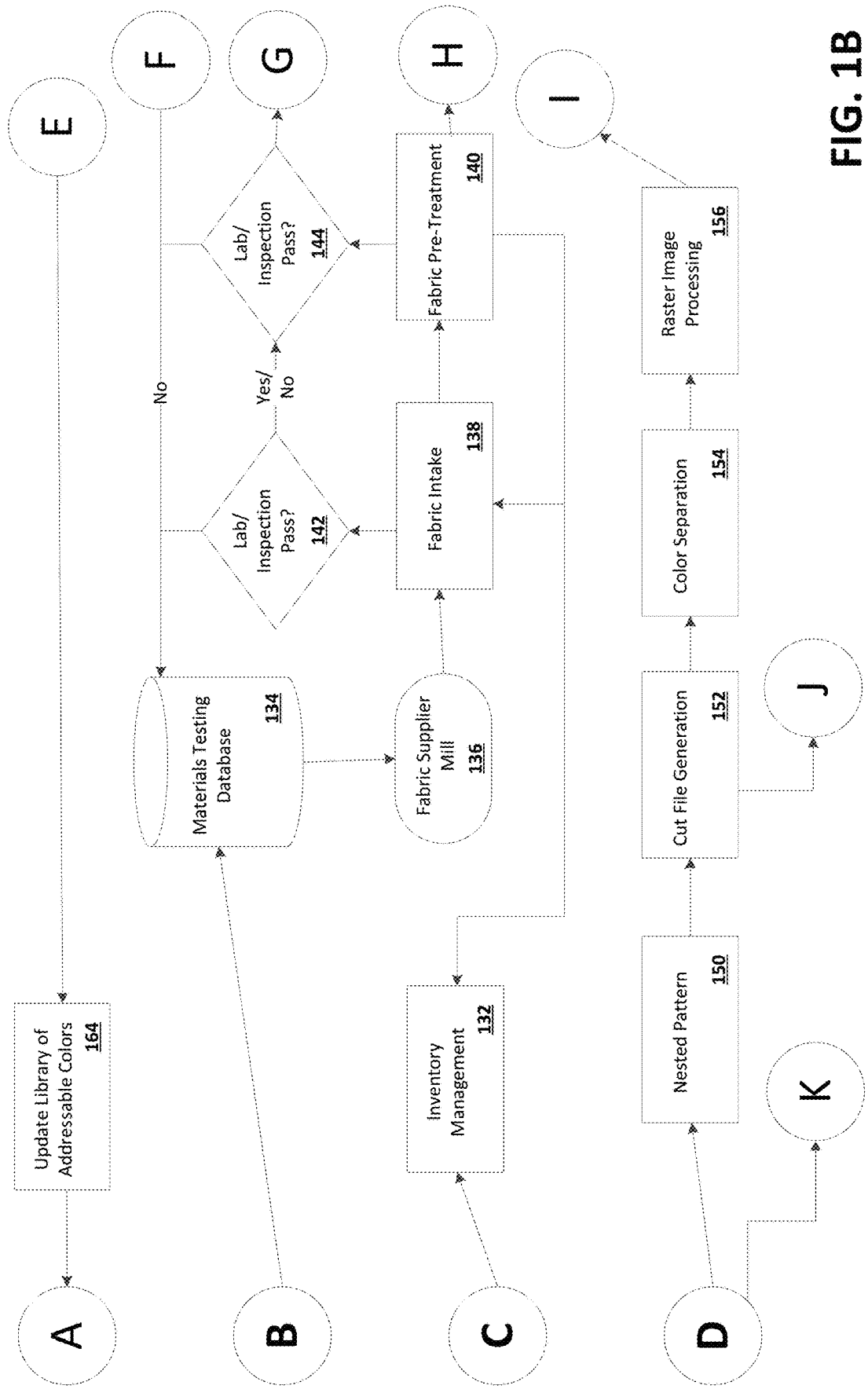
Figure 1C:
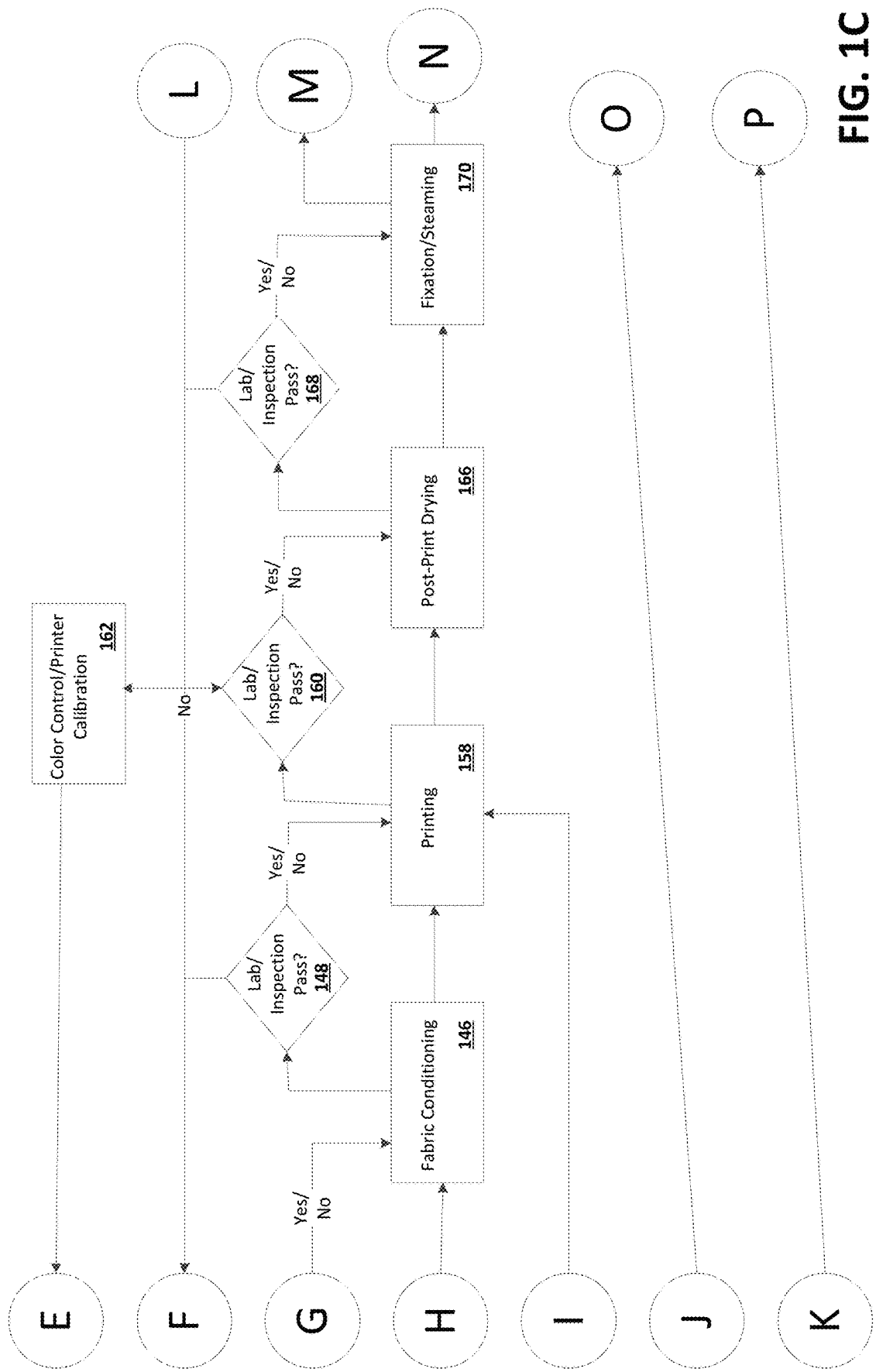
Figure 1D:
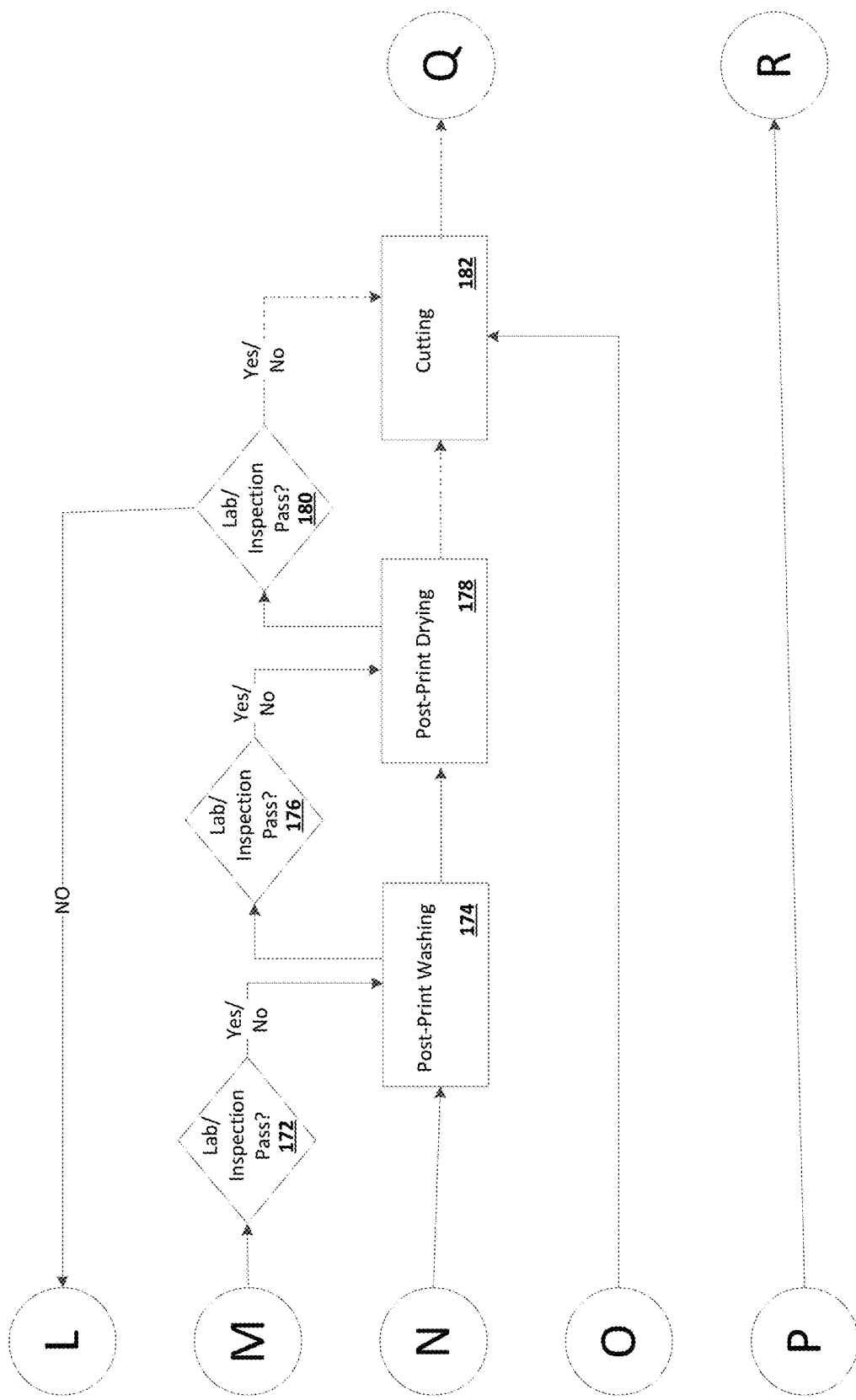
Figure 1E:
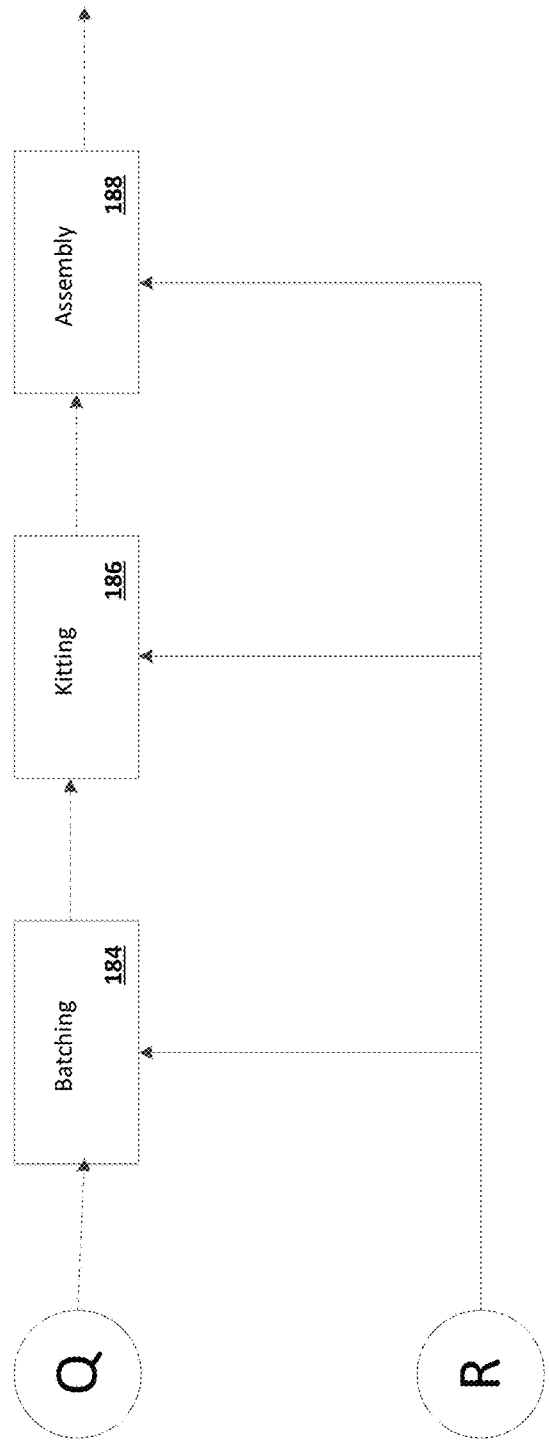

The systems and/or methods described herein may comprise a business process. The business process may comprise a process for creation of a job file (e.g., 110 in FIG. 1A). The job file may comprise instructions for authoring tools, instructions for digital asset management, and/or instructions for patterns and/or markers. The authoring tools may comprise 2-dimensional design tools, 3-dimensional polygonal design tools, and/or 3-dimensional parametric design tools. Digital asset management may comprise information about digital materials, graphics, images, 3-dimensional assets, color profiles, fit blocks, design library management, material development, line planning, bill of materials, material testing, vendor collaboration, and/or financial planning. Digital asset management, as described herein, may comprise or may be based on data regarding materials physical properties, material spectral reflectance and refractance properties, materials performance properties, materials provenance and related resource consumption, batch serialization, and the like. The patterns and/or markers may comprise information about patterns, reference points, cut data, grading, graphic images, colors, cut plans, job status management, and/or material utilization. The job file may comprise options to be selected by a user. The job file may comprise options selected by the user. The job file may comprise options selected without intervention by the user.

The job file may be created by one or more computing devices ("job file creator"). The job file creator may be in communication with one or more computing devices configured to gather real-time and/or near real-time manufacturing and/or consumer data ("data gathers") via a network. The job file and/or parameters available associated with the job file may be influenced by real-time data received from the data gathers. The job file creator may be in communication with one or more computing devices configured to cause execution of one or more manufacturing steps ("controllers") via a network. The job file creator may provide the job file to the controllers. The controllers may cause execution of the one or more manufacturing steps in accordance with the job file.

The systems and/or methods described herein may comprise a feedback loop for designers. Biometric data and/or consumer data may be captured and trends may be identified. The options available to designers on their design tools may be influenced by the captured biometric and/or consumer data. The designers may design clothing based on the options available on their design tools. Biometric and/or consumer data associated with the designed clothing may be captured and trends may be identified, thus restarting the feedback loop.

The systems and/or methods described herein may use nesting to efficiently use materials that need to be cut. Nesting involves arranging patterns that are cut from materials such that waste from the cutting is lessened. Nesting may involve arranging components that have similar or the same colors and/or patterns at borders such that two such borders of two components are adjacent to each other. Nesting may involve using color overlap between two or more components. Nesting may involve dynamically batching orders.

The systems and/or methods described herein may comprise a foam pretreatment process. The foam pretreatment process may replace a traditional dipping process. The foam pretreatment process may reduce water. The foam pretreatment process may reduce energy. The foam pretreatment process may reduce the use of chemicals. The foam pretreatment process may achieve deeper and/or richer colors. The foam pretreatment process may dry easier than the traditional dipping process.

The systems and/or methods described herein may comprise a plasma pre-cleaning/activation process. The atmospheric plasma pre-cleaning/activation process may comprise corona plasma. The atmospheric plasma pre-cleaning/activation process may be used to clean fabric and/or material and increase the surface roughness of fabric/fibers and/or material to improve adhesion properties. The atmospheric plasma pre-cleaning/activation process may be used to vaporize remove (decompose) contaminants (e.g., oils, waxes, etc.) from fabric and/or material. The atmospheric plasma pre-cleaning/activation process may clean fabric and/or material after and/or before the foam pretreatment and/or pad process. The atmospheric plasma pre-cleaning/activation process may activate fabric and/or material. The plasma pre-cleaning/activation process may achieve deeper and/or more saturated colors on fabric and/or material, while using less dyes and/or chemicals. The plasma pre-cleaning/activation process may be waterless and occurs at environment temperature. The plasma pre-cleaning/activation process can be applied by different carrier gases such as air, oxygen, nitrogen, helium, argon, hydrocarbon-based gases, fluorocarbon-based gases and/or mixture of different gases. Each gas provides different surface topography, chemistry and surface energy to the fabric and/or materials. Some grafting reaction (functionalization reactions) may take place between the fabric and/or material and plasma carrier gas. Chemical composition of fabric and/or material on the surface can be changed after plasma process. The systems and/or methods described herein may comprise a colorization analyze process. The colorization analyze process may compare an intended color and an actual color. The colorization analyze process may determine the intended color from digital data, such as data from the job file. The colorization analyze process may determine the actual color using computer vision.

The systems and/or methods described herein may comprise inserting and/or adding one or more sensors to a fabric operation, such as for in-line inspection of materials before, during, and/or after an operation. The one or more sensors may comprise a spectrometer. The one or more sensors may comprise an optical spectrometer. The one or more sensors may comprise a spectrophotometer. At one or more steps of a manufacturing process, the one or more sensors may be inspected to ensure quality. The one or more sensors may be manually inspected by a human. The one or more sensors may be inspected by one or more computing devices. Inspecting the one or more sensors by one or more computing devices may comprise comparing an observed data set with an expected data set. Inspecting the one or more sensors by one or more computing devices may comprise triggering an alert when a difference between the observed data set and the expected data set is greater than a predetermined threshold. In an aspect, identification may be added to a material, such as bar codes, QR codes, invisible markers, etc. to enable reading or sensing that code with a reader device such as a spectrometer, for example.

The systems and/or methods described herein may comprise an observation process. The observation process may comprise observing patterns on fabric. The fabric may undergo one or more manufacturing steps. The observation process may comprise observing the patterns on the fabric after the one or more manufacturing steps. The observation process may comprise determining a delta between the observed pattern on the fabric before the one or more manufacturing steps and the observed pattern on the fabric after the one or more manufacturing steps. The observation process may be performed by one or more computing devices ("observers"). The observers may provide the determined delta to one or more computing devices in communication with a machine for cutting the fabric.

Digital Product Creation

Conventional processes for article creation comprise siloed and manual steps/operations. The present disclosure enables consumers to customize the products via ordering systems and may include the ability for user inputted data such as their measurements. Software may generate auto-patterns and the based on the tailoring rules that are being established, the solution will pick an appropriate pattern. Such software may comprise custom selection of color or graphic(s), which may be used in the auto-generation of a pattern or a selection of an existing pattern. This pattern may then associated with the design bill of materials comprising work instructions to a manufacturing site. The systems and methods may be integrated with back-end systems that enable on-demand manufacturing.

Made to Measure

Today, the front end consumer facing systems offer the capability to customize the products from the list of options. These options are mapped to the back-end manufacturing systems and are therefore limited by the same. The ability to customize to suit a unique size is limited. Further, the options to personalize the product is also limited. The option to do this on demand is not existing. The present disclosure provides the ability to customize the product, or add user inputted information to the product. The systems and methods may dynamically configure the product to suit the individual's requirement and create a package that is manufacture ready. The systems and methods may be further extended to automate the bulk of the product creation.

Pre-Distortion of Image

In conventional textile processing, textile materials are processed in 'web' form whereby mechanical forces and/or mechanical forces combined with heat cause distortion across the 'web'. The implication is that an image printed on a digital printer can be controlled to an accuracy within nanometers, but subsequent processing can result in distortion that is not what the author intended. The present disclosure receives information associated with the distortion of the raw material web through downstream processing and then map that distortion so that the image applied to the web at the digital printing stage can be 'pre-distorted' so that the final product matches the author's intention. As an example, the present disclosure may address one or more shortcomings of the conventional processes using feedback loop/validation as show, for example, in FIG. 12.

Manipulation of materials in the manufacturing process (e.g. manipulating a printed upper material around a last) creates a bowing and skewing of imagery or patterns from the intended print. In accordance with the present disclosure, an example illustrated in at least FIG. 9A, by including pre-distortion into the print-job file to account for downstream processes one can manufacture an end product truer to the original form.

Material Categorization

Current industry practice is fragmented, paying no mind to substrates and their respective impact on multi-spectral color refractance, translucence, opacity, or the like. Additionally, substrate construction has material impact on the way a fabric drapes and/or flows in real life. Additional input data such as one or more of whiteness Index, pH, degree of mercerization, refractance and reflectance index, thickness, compression, bending, roughness, friction, thermal properties, smoothness, softness, warmth, puckering, distortion, composite measurements thereof, or natural observed performance history and variance. In accordance with aspects of the present disclosure, by collecting substrate characteristics and performance data (e.g. whiteness index, pH, and so forth) and integrating these characteristics, one can digitally recreate critical design and performance characteristics in a digital format, i.e. create a digital twin that we can produce an honest recreation of in real life.

Order Creation and Job Management

FIGS. 1A-1E show an example diagram of a management (e.g., manufacturing) process. Although an example sequence is shown, it is understood that the various steps may be implemented in any order and may be selectively implemented or not implemented. Feedback loops from one or more downstream processes may be received and may be used to update one or more upstream processes. As an example, data collected at any one of the manufacturing steps may be shared upstream or downstream in the end-to-end process and may be used to update other processes. As a further example, all manufacturing steps may be implemented at a single facility to provide complete end-to-end control. However, data shared between the steps may allow one or more processes to be at different facilities without losing control or standardization. At 100, a project request and/or order may be received. The project request and/or order may be received at one or more computing devices associated with a clothing manufacturer. The project request and/or order may be received at a cloud computing environment associated with the clothing manufacturer. As used herein manufacture or manufacturer may refer to operations or entities associated with any portion of management of article production and delivery. The project request and/or order may be received from a client device associated with a customer.

In response to the project request and/or order being received, a job (e.g., order, project, etc.) file 110 may be created. The job file 110 may comprise a graphic design file 112, grading information 114, a quantity/yardage request 116, kitting data 118, order data 120, a pattern file 122, a substrate 124, finishing data 126, assembly data 128, and/or tracking and/or routing data 130. The job file 110 may comprise a bill of materials and/or serialization data. Other information may be comprised in the job file 110 or may be referenced in/by the job file 110.

In response to the project request and/or order being receive, a determination may be made if fabric associated with the project request and/or order is already created at 102. The one or more computing devices and/or the cloud computing environment associated with the clothing manufacturer may determine if fabric associated with the project request and/or order is already created. If the fabric has not already been created, then the process may move to 106. If the fabric has already been created, then the process may move to 104.

At 104, a determination may be made if fabric associated with the project request and/or order is in stock. The one or more computing devices and/or the cloud computing environment associated with the clothing manufacturer may determine if fabric associated with the project request and/or order is in stock. If the fabric is in stock, then the process may move to 108. If the fabric is not in stock, then the process may move to 106.

At 106, the fabric associated with the project request and/or order may be ordered. The one or more computing devices and/or the cloud computing environment associated with the clothing manufacturer may order fabric from a fabric supplier. After the fabric associated with the project request and/or order is ordered, a materials testing database 134 may be updated and the process may move to 108.

At 108, a purchase order and/or a procedure to pay cycle associated with the fabric associated with the project request and/or order may be caused to be processed. The one or more computing devices and/or the cloud computing environment associated with the clothing manufacturer may process the purchase order and/or the procedure to pay cycle. The one or more computing devices and/or the cloud computing environment associated with the clothing manufacturer may cause another one or more computing devices to process the purchase order and/or the procedure to pay cycle.

After the purchase order and/or the procedure to pay cycle associated with the fabric associated with the project request and/or order are caused to be processed, inventory management may be performed at 132. The one or more computing devices and/or the cloud computing environment associated with the clothing manufacturer may perform inventory management and/or cause inventory management to be performed. Performing inventory management may comprise updating an inventory to reflect the purchase order and/or the procedure to pay cycle associated with the fabric associated with the project request and/or order. Performing inventory management may comprise using inventory information as part of a fabric intake step at 138. Performing inventory management may comprise updating inventory information based on the fabric intake step at 138. Performing inventory management may comprise updating inventory information based on a fabric pre-treatment step at 140.

The materials testing database 134 may be in communication with one or more computing devices associated with a fabric supplier mill 136. The materials testing database 134 may cause an order for fabric to be placed with the fabric supplier mill 136. The fabric supplier mill 136 may cause fabric to be delivered to the clothing manufacturer as part of the fabric intake step at 138.

At 138, a material operator or manager, such as the clothing manufacturer, may have or may receive material (e.g., fabric from the fabric supplier mill 136 as part of the fabric intake step at 138). Other materials may be used. After the fabric intake step, the process may move to the fabric pre-treatment step at 140. It is understood that is not to limit such a process to a garment manufacture, but is a non-limiting example. Other entities and operators may execute the same or similar operations. In an aspect, operational capacity such as manufacturing capacity for a particular product may be considered in order to determine quoted lead time (e.g., in real time) and may enable surge pricing/priority pricing.

After the fabric intake step at 138, a lab and/or visual inspection may be performed at 142. The inspection may comprise an inspection by a human. The inspection may comprise an inspection using computer vision. The inspection may comprise an inspection of one or more sensors in communication with the fabric. If the fabric fails the inspection, then the material testing database 134 may be updated (which, in turn, may cause the material testing database 134 to order more fabric from the fabric supplier mill 136). The results of the lab and/or visual inspection may be passed to a lab and/or visual inspection at 144.

The fabric pre-treatment step at 140 may comprise a foam pretreatment process. The foam pretreatment process may replace a traditional dipping process. The foam pretreatment process may reduce water. The foam pretreatment process may reduce energy. The foam pretreatment process may reduce the use of chemicals. The foam pretreatment process may achieve deeper and/or richer colors. The foam pretreatment process may dry easier than the traditional dipping process. Fabric that has underwent the foam pretreatment process may be used in a fabric conditioning step at 146.

After the fabric pre-treatment step at 140, the lab and/or visual inspection at 144 may be performed. The inspection may comprise an inspection by a human. The inspection may comprise computer vision, machine vision, and machine learning. The inspection may comprise an inspection of one or more sensors in communication with the fabric. If the fabric fails the inspection, then the material testing database 134 may be updated (which, in turn, may cause the material testing database 134 to order more fabric from the fabric supplier mill 136). If the fabric fails inspection, it may also result in the generation of a new order to backfill the failed material dependent on the type of failure/defect. The failure may result in a change to the quoted lead time. The results of the lab and/or visual inspection may be passed to one or more computing devices involved in the fabric conditioning step at 146.

The fabric conditioning step at 146 may comprise an atmospheric plasma pre-cleaning/activation process. The atmospheric plasma pre-cleaning/activation process may comprise corona plasma. The atmospheric plasma pre-cleaning/activation process may be used to clean fabric and/or material and increase the surface roughness of fabric/fibers and/or material to improve adhesion properties. The atmospheric plasma pre-cleaning/activation process may be used to vaporize remove (decompose) contaminants (e.g., oils, waxes, etc.) from fabric and/or material. The atmospheric plasma pre-cleaning/activation process may clean fabric and/or material after and/or before the foam pretreatment and/or pad process. The atmospheric plasma pre-cleaning/activation process may activate fabric and/or material. The plasma pre-cleaning/activation process may achieve deeper and/or more saturated colors on fabric and/or material, while using less dyes and/or chemicals. The plasma pre-cleaning/activation process may be waterless and occurs at environment temperature. The plasma pre-cleaning/activation process can be applied by different carrier gases such as air, oxygen, nitrogen, helium, argon, hydrocarbon-based gases, fluorocarbon-based gases and/or mixture of different gases. Each gas provides different surface topography, chemistry and surface energy to the fabric and/or materials. Some grafting reaction (functionalization reactions) may take place between the fabric and/or material and plasma carrier gas. Chemical composition of fabric and/or material on the surface can be changed after plasma process. Fabric that has underwent the plasma pre-cleaning/activation process may be used in a printing step at 158.

After the fabric conditioning step at 146, a lab and/or visual inspection at 148 may be performed. The inspection may comprise an inspection by a human. The inspection may comprise an inspection using computer vision. The inspection may comprise an inspection of one or more sensors in communication with the fabric. If the fabric fails the inspection, then the material testing database 134 may be updated (which, in turn, may cause the material testing database 134 to order more fabric from the fabric supplier mill 136). The results of the lab and/or visual inspection may be passed to one or more computing devices involved in the printing step at 158.

At 150, the job file 110 may be used as part of a nested pattern step. One or more computing devices may use the job file 110 as part of the nested pattern step. The pattern file 122 of the job file 110 may be used as part of the nested pattern step. Other portions of the job file 110 may also be used, such as the graphic design file 112, the grading information 114, etc. The nested pattern step will be described in more detail in reference to FIG. 3. After the nested pattern step, the process may move to 152. As described herein, nesting may be generated or updated based on upstream or downstream information. Alternatively or additionally, nesting may be updated based on information received relating to downstream process or device performance. For example, if a cutting process or machine, or if a material handling process or machine/system is performing in a particular manner the nesting may be updated based on such performance information.

At 152, a cut file may be generated. The cut file may be generated in response to the nested pattern step. One or more computing devices may generate the cut file. The cut file may comprise information for cutting components out of fabric. The cut file may be used in a cutting step at 182. After the cut file is generated, the process may move to 154. Various files are referenced for illustration. It should be understood that several files or a single file may be used.

At 154, a color separation step may be performed. One or more computing devices may perform the color separation step. The job file 110 may be used to perform the color separation step. After the color separation step, the process may move to 156.

At 156, a raster image processing step may be performed. One or more computing devices may perform the raster image processing step. The job file 110 may be used to perform the raster image processing step. After the raster image processing step, the process may move to 158.

At 158, the printing step may be performed. Although the term printing is used, it should be understood that drop on demand references generic selective processes that include selective deposition of materials and digital printing, for example. The printing step may comprise causing color and/or graphics to be printed on fabric. One or more computing devices may cause color and/or graphics to be printed on fabric. A result of the raster image processing step at 156 may be used to influence the printing of the color and/or the graphics on the fabric. The job file 110 may be used to influence the printing of the color and/or the graphics on the fabric. Fabric that has underwent the printing process may be used in a post-print dying step at 166.

After the printing step at 158, a lab and/or visual inspection at 160 may be performed. The inspection may comprise an inspection by a human. The inspection may comprise an inspection using computer vision. The inspection may comprise an inspection of one or more sensors in communication with the fabric. The inspection may determine if and to what extent there are differences between an expected color and a color actually printed on fabric during the printing step at 158. The results of the lab and/or visual inspection may be passed to one or more computing devices associated with a color control/printer calibration step at 162. The one or more computing devices associated with the color control/printer calibration step at 162 may provide information to help with the inspection at 160. The results of the lab and/or visual inspection may be passed to one or more computing devices involved in the post-print dying step at 166.

At 162, one or more computing devices associated with the color control/printer calibration step may determine and/or receive information indicative of a discrepancy between an expected color and a color actually printed on fabric at 158. The one or more computing devices associated with the color control/printer calibration step may determine a new paint color to associate with the expected color. The one or more computing devices associated with the color control/printer calibration step may determine that the new paint color needs more or less of a particular color, such as red, blue, and/or green, to be closer to the expected color. The one or more computing devices associated with the color control/printer calibration step may communicate with one or more computing devices associated with an update library of addressable colors step at 164.

At 164, the one or more computing devices associated with the update library of addressable colors step may update a library of addressable colors based on information from the one or more computing devices associated with the color control/printer calibration step. The one or more computing devices associated with the update library of addressable colors step may assign the determined new paint color to the expected color. The one or more computing devices associated with the update library of addressable colors step may cause a new project request and/or order at 110 using the updated library of addressable colors to be created.

At 166, the post-print drying step may be performed. The post-print dying step may comprise drying fabric. One or more computing devices may cause the fabric to be dried. Fabric that has underwent the post-print dying process may be used in a fixation/steaming step at 170.

After the post-print drying step at 166, a lab and/or visual inspection at 168 may be performed. The inspection may comprise an inspection by a human. The inspection may comprise an inspection using computer vision. The inspection may comprise an inspection of one or more sensors in communication with the fabric. If the fabric fails the inspection, then the material testing database 134 may be updated (which, in turn, may cause the material testing database 134 to order more fabric from the fabric supplier mill 136). The results of the lab and/or visual inspection may be passed to one or more computing devices involved in the fixation/steaming step at 170.

At 170, the fixation/steaming step may be performed. The fixation/steaming step may comprise steaming fabric that has been printed and/or dyed. One or more computing devices may cause the fabric to be steamed. Fabric that has underwent the fixation/steaming step may be used in a post-print washing step at 174.

After the fixation/steaming step at 170, a lab and/or visual inspection at 172 may be performed. The inspection may comprise an inspection by a human. The inspection may comprise an inspection using computer vision. The inspection may comprise an inspection of one or more sensors in communication with the fabric. The results of the lab and/or visual inspection may be passed to one or more computing devices involved in the post-print washing step at 174.

At 174, the post-print washing step may be performed. The post-print washing step may comprise washing fabric that has been steamed and/or fixated. One or more computing device may cause the fabric to be washed. Fabric that has underwent the post-print washing step may be used in a post-print drying step at 178.

After the post-print step at 174, a lab and/or visual inspection at 176 may be performed. The inspection may comprise an inspection by a human. The inspection may comprise an inspection using computer vision. The inspection may comprise an inspection of one or more sensors in communication with the fabric. The results of the lab and/or visual inspection may be passed to one or more computing devices involved in the post-print drying step at 178.

At 178, the post-print drying step may be performed. The post-print drying step may comprise drying fabric that has been washed. One or more computing device may cause the fabric to be dried. Fabric that has underwent the post-print drying step may be used in a cutting step at 182.

After the post-print drying step at 178, a lab and/or visual inspection at 180 may be performed. The inspection may comprise an inspection by a human. The inspection may comprise an inspection using computer vision. The inspection may comprise an inspection of one or more sensors in communication with the fabric. If the fabric fails the inspection, then the material testing database 134 may be updated (which, in turn, may cause the material testing database 134 to order more fabric from the fabric supplier mill 136). The results of the lab and/or visual inspection may be passed to one or more computing devices involved in the cutting step at 182.

At 182, the cutting step may be performed. The dried fabric may be cut. The dried fabric may be cut according to the cut file generated at 152. One or more computing devices may cause the fabric to be cut. Fabric that has underwent the cutting step may be used in a batching step at 184.

At 184, the batching step may be performed. The cut fabric may be batched. One or more computing devices may cause the fabric to be batched. Fabric that has underwent the batching step may be used in a kitting step at 186.

At 186, the kitting step may be performed. The batched fabric may be kitted. One or more computing devices may cause the fabric to be kitted. Fabric that has underwent the kitting step may be used in an assembly step at 188.

At 188, the assembly step may be performed. The kitted fabric may be assembled. One or more computing devices may cause the fabric to be assembled. Fabric that has underwent the assembly step may be shipped to customers.

Other steps and processes may be performed. Steps may be selectively performed or not performed. Data may be shared between the processes and processes may be updated based on the shared data relating to the performance of the upstream and/or downstream processes and equipment.

Design/Product Development

Current design and product development tools are not digitally linked to any real-life production methods. In accordance with the present disclosure, digital product creation may comprise manufacturing (printing) instructions created from the design platform. Coloration feasibility will have feedback loop to inform design platform and define designer's choices for the product.

Figure 2:
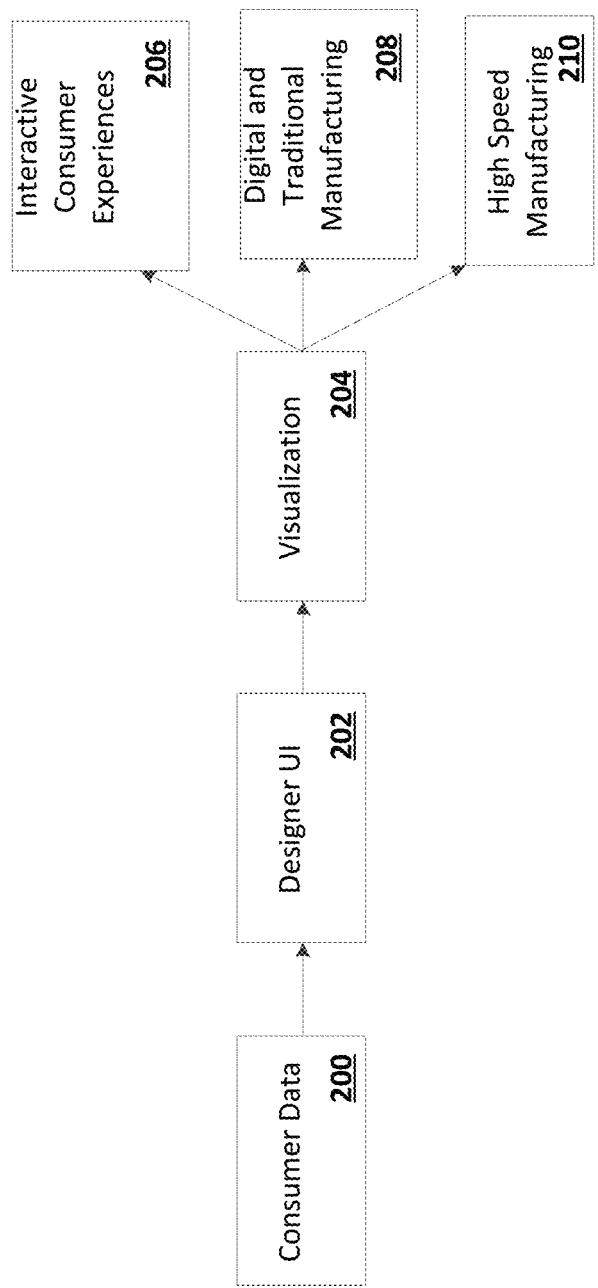
FIG. 2 shows an example diagram of a design process.

FIG. 2 shows an example diagram of a design process. At 200, consumer data may be received (e.g., collected, etc.). The consumer data may comprise biometric data. The consumer data may be collected from one or more consumers. The consumer data may be collected from one or more wearable devices. The consumer data may be collected from one or more e-commerce websites. The consumer data may be collected from a feedback loop. The consumer data may be collected from a repository.

At 202, a designer user interface may influenced by the consumer data. Colors and/or designs that are options in design tools may be influenced by the consumer data. Colors and/or designs that are options in design tools may be influenced by business reasons, such as a preferred material that is prominently featured in the designer user interface or a disfavored color and/or pattern that is disallowed by the designer user interface. The designer user interface may be associated with a 2-dimensional and/or 3-dimensional design and/or development tool.

At 204, a visualization tool may be influenced by the 2-dimensional and/or 3-dimensional design and/or development tool. The visualization tool may be influenced by the consumer data. Colors and/or designs that are options and/or appear in visualizations created by the visualization tool may be influenced by the consumer data.

At 206, interactive consumer experiences may be presented to consumers via e-commerce websites. The interactive consumer experiences presented to consumers may by influenced by the visualization tool. The interactive consumer experiences presented to consumers may by influenced by the 2-dimensional and/or 3-dimensional design and/or development tool. The interactive consumer experiences presented to consumers may be influenced by the consumer data. Colors and/or designs that are options and/or appear in the interactive consumer experiences may be influenced by the consumer data. Feedback from the interactive consumer experiences may be new consumer data at 200.

At 208, drop-on-demand (e.g., digital) and/or traditional manufacturing may be influenced by the visualization tool. The digital and/or traditional manufacturing may by influenced by the 2-dimensional and/or 3-dimensional design and/or development tool. The digital and/or traditional manufacturing may be influenced by the consumer data. Colors and/or designs that are options and/or appear in the digital and/or traditional manufacturing may be influenced by the consumer data. Feedback from the digital and/or traditional manufacturing may be new consumer data at 200.

At 210, high speed manufacturing may be influenced by the visualization tool. The high speed manufacturing may by influenced by the 2-dimensional and/or 3-dimensional design and/or development tool. The high speed manufacturing may be influenced by the consumer data. Colors and/or designs that are options and/or appear in the high speed manufacturing may be influenced by the consumer data. Feedback from the high speed manufacturing may be new consumer data at 200.

Designing and developing for fashion trends is currently fragmented and not directly driven by consumer demand-designer. Creators will make best estimate for what will be on trend and hope for the best. This conventional manner is not optimized. In accordance with the present disclosure, improved on-demand feedback loop may allow for the data-driven forecasting of needed colorways and designs.

Figure 3:
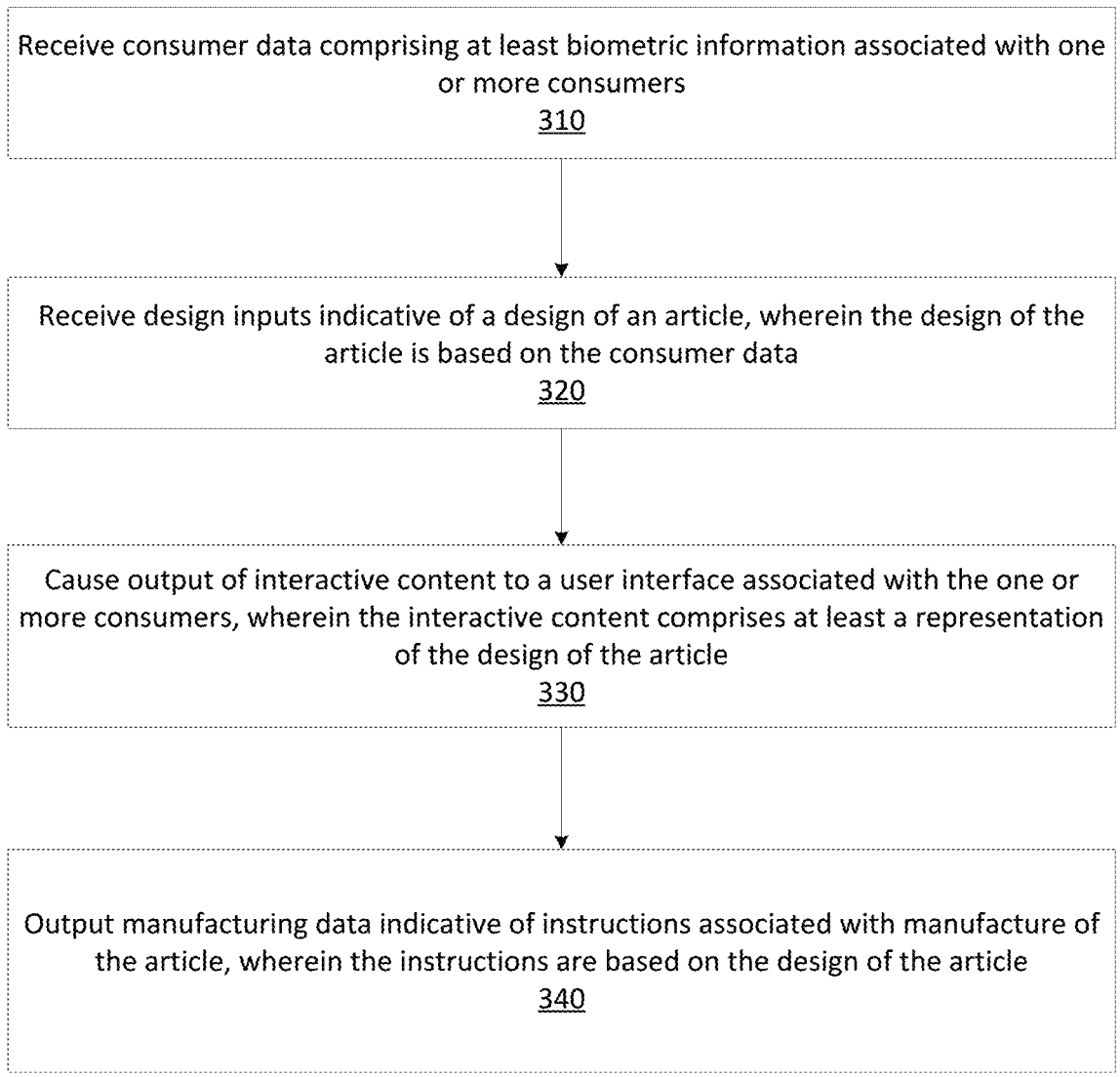
FIG. 3 is a flow diagram of an example method.

Referring to FIG. 3, a method for manufacturing an article is illustrated. The method may allow for customization. The method may allow for dynamic pricing. The method may allow for dynamic lead time determination. The method may allow for dynamic delivery.

At step 310, consumer data comprising at least biometric information associated with one or more consumers may be received. One or more computing devices may receive consumer data comprising at least biometric information associated with one or more consumers. The consumer data may comprise consumer preference information.

At step 320, design inputs indicative of a design of an article may be received. One or more computing devices may receive design inputs indicative of a design of an article. The design of the article may be based on the consumer data. The design inputs indicative of the design of the article may be consumer facing, such as design inputs for made to measure articles or personalized and/or custom articles. The design inputs indicative of the design of the article may be used for product design for mass produced articles. The design inputs indicative of the design of the article may comprise auto-pattern creation. The design inputs indicative of the design of the article may come directly from a manufacturer. The design inputs indicative of the design of the article may fit a design model. A "fit model" is a model utilized by a brand to design a product line's sizing parameters, i.e. a standard collection of dimensions scaled to each available size.

At step 330, output of interactive content may be caused to a user interface associated with the one or more consumers. One or more computing devices may cause output of interactive content to a user interface associated with the one or more consumers. The interactive content may comprise at least a representation of the design of the article.

At step 340, manufacturing data indicative of instructions associated with manufacture of the article may be outputted. One or more computing devices may output manufacturing data indicative of instructions associated with manufacture of the article. The instructions may be based on the design of the article. The outputting manufacturing data may comprise outputting, to a digital print system, at least a portion of the manufacturing data. The manufacturing data may be provided directly to a manufacturer from a designer. The manufacturing data may be provided directly to a manufacturer from a customer.

Coloration data indicative of a coloration feasibility may be received. One or more computing devices may receive coloration data indicative of a coloration feasibility. The design of the article may be dependent on the coloration data.

Sensors in clothing may detect when the clothing are being worn. The sensors may communicate with applications executing on client devices. The applications may relay information from the sensors to a centralized server. The centralized server may comprise an application to determine trend information, such as which colors, patterns, and/or fabrics are being worn most often. The centralized server may provide the determined trend information to a server associated with an e-commerce website or a browser executing on a user device that is accessing the e-commerce website. The e-commerce website may make suggestions based on the determined trend information.

Figure 4:
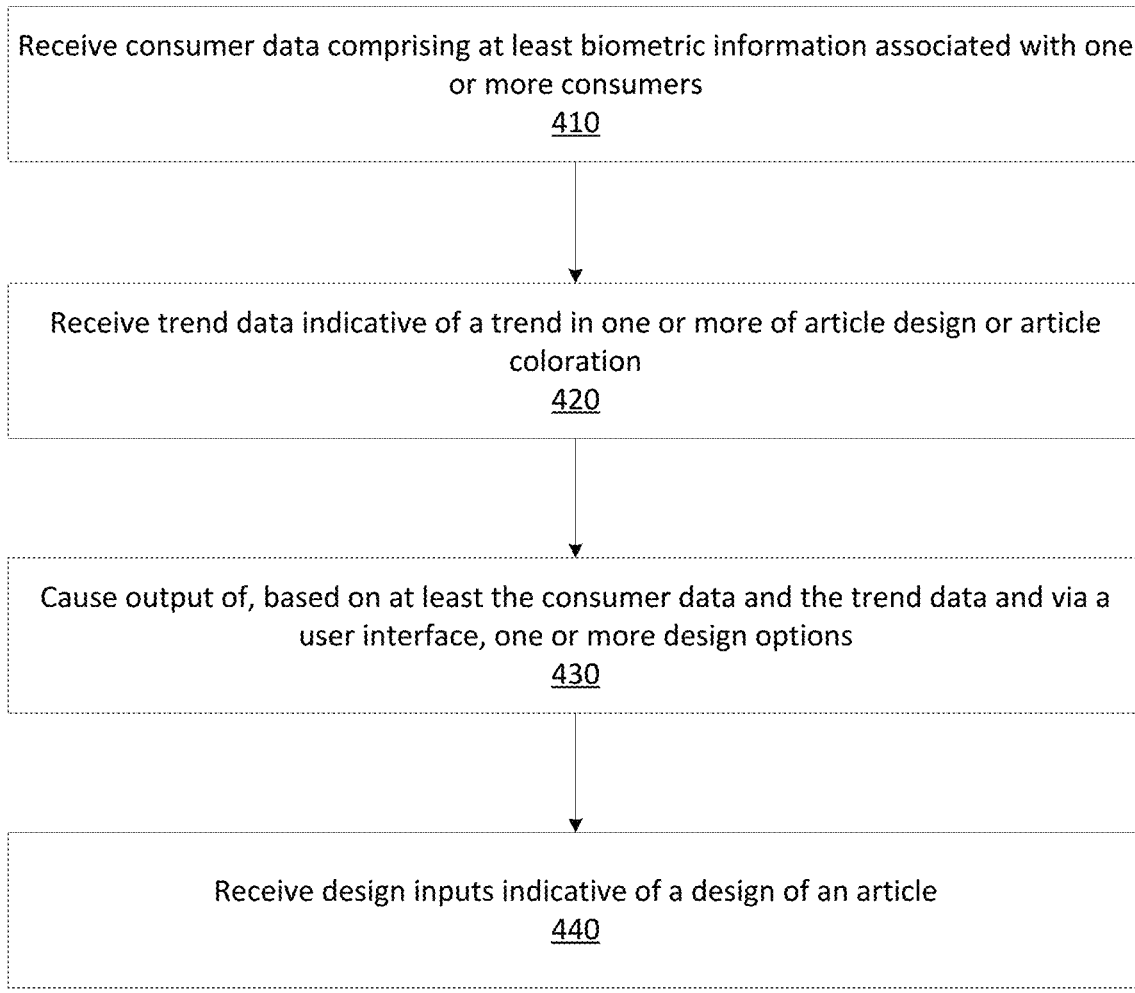
FIG. 4 is a flow diagram of an example method.

Referring to FIG. 4, a method for article development is illustrated. At step 410, consumer data comprising at least biometric information associated with one or more consumers may be received. One or more computing devices may receive consumer data comprising at least biometric information associated with one or more consumers. The consumer data may comprise consumer preference information.

At step 420, trend data indicative of a trend in one or more of article design or article coloration may be received. One or more computing devices may receive trend data indicative of a trend in one or more of article design or article coloration.

At step 430, output of one or more design options may be caused based on at least the consumer data and the trend data and via a user interface. One or more computing devices may cause output of one or more design options based on at least the consumer data and the trend data and via a user interface.

At step 440, design inputs indicative of a design of an article may be received. One or more computing devices may receive design inputs indicative of a design of an article.

In response to receiving the design inputs, types of fabrics may be presented to a designer. The designer may select one or more of the types of fabrics presented. In response to the selected one or more types of fabrics, an integrated technology package may be created for the designer. The integrated technology package may fit the design inputs and the selected one or more types of fabrics. An engineering bill of material may be generated for the integrated technology package. The engineering bill of material may be generated on-demand.

Sensors in clothing may detect when the clothing are being worn. The sensors may communicate with applications executing on client devices. The applications may relay information from the sensors to a centralized server. The centralized server may comprise an application to determine trend information, such as which colors, patterns, and/or fabrics are being worn most often. The centralized server may provide the determined trend information to a server associated with a remotely accessible designer tool or a browser executing on a user device that is accessing the remotely accessible designer tool. The designer tool may make suggestions based on the determined trend information. A user may create a design based on the suggestions. The user may create an order based on the design. A bill of material may automatically be generated based on the order.

As an example, a method for article management may comprises receiving consumer data comprising at least biometric information associated with one or more consumers. The consumer data may further comprises consumer preference information. The method may comprise receiving design inputs indicative of a design of an article. The design of the article may be based on the consumer data and/or other inputs. The method may comprise causing output of interactive content to a user interface associated with the one or more consumers. The interactive content may comprise at least a representation of the design of the article. The method may comprise outputting article data comprising at least manufacturing data indicative of instructions associated with manufacture of the article. The outputting manufacturing data may comprises outputting, to a drop-on-demand system (e.g., digital print system), at least a portion of the manufacturing data. The instructions may be based on the design of the article. The article data may be configured to be received by one or more computing devices associated with one or more manufacturing processes, wherein the one or more manufacturing processes are updated based on at least the article data. The method may comprise receiving coloration data indicative of a coloration feasibility, wherein the design of the article is dependent on the coloration data. The method may comprise generating a tech pack based on the design of the article and a fabric selection. The method may comprise outputting a bill of material based on the design of the fabric. Other steps may be used. As a further example, one or more methods may comprise wherein the article data comprises nesting information indicating a spatial placement of one or more parts of the article, and wherein the nesting information is at least partially derived from one or more of: characteristics of a material used to form at least a portion of the one or more parts of the article, one or more treatments applied to a material used to form at least a portion of the one or more parts of the article, a desired web speed, or an operation performed by a pick and place system configured to move the one or more parts of the article once separated from the material. The nesting information may be at least partially derived from a feedback loop associated with operations of the pick and place system. Data may be collected from any number of systems, subsystems, or devices and may be shared upstream and/or downstream to effect updates in one or more processes.

Order Aggregation and Batch Processing

Conventional order processing for digital printers does not account for the entire manufacturing process of single order execution systems. This is largely driven by a fragmentary value chain where each process takes into account efficiencies for their respective processes, but not the overall manufacturing process and its associated holistic cost. The present disclosure provides dynamic nesting optimization. As an example, dynamic nesting optimization may comprise the individual consumer order—specifically the theoretical minimum order quantity (MOQ) of one—and batching order components to maximize production and delivery speed back to the end customer within business-directed product performance, unit costs/margins, and sustainability parameters.

In single unit order execution, individual components can have vastly different levels of ink applied. In the subsequent washing processes, components with high levels of ink can cross-contaminate adjacent components with low levels of ink (e.g. a bright red component adjacent to a white component) leading to off quality. In accordance with the present disclosure, by analyzing the levels of ink required to print each discrete component, a nested pattern can be created that starts with the lowest levels on ink and builds to the highest levels of ink. Therefore, dark and saturated components (e.g. a bright red component) will be adjacent to components that are also dark in color thereby hiding cross contamination from a dark color to a light color. When said material is running through the washing process, the lightest colors will go first (when water on the washer is cleanest) and dark colors go last. This may allow for using less water and chemistry for lighter colors and make the overall process more efficient and sustainable.

Conventional production planning processes do not account for optimizing small batches (as small as a single unit) into large runs that take advantage of both digital manufacturing processes (e.g. digital printing) as well as conventional 'continuous' production processes (e.g. drying, washing). In accordance with the present disclosure, rules may be used that aggregate and organize small batches into larger batches while taking into account different downstream routings whereby small batches can be aggregated for common processes, and then split back into smaller batches for separate routings in a way that can be efficiently scheduled in production.

Nesting

Current process of creating RIP and print job files do not account for separate throughput speeds for actual printing or downstream processing. The present disclosure may integrate considerations for printing, finishing, assembly and other manufacturing processes to batch throughputs for greater efficiency and overall speed.

Nesting optimization in digital printing processes currently used are on the order of 60%-70%, which is very poor (waste of 30%-40% of material) versus materials optimization for conventional apparel manufacturing on the order of 80%-95% (waste of 5%-20% of material). Nesting optimization needs to improve in the digital printing space in order to make the process sustainable and feasible at commercial scale. The present disclosure may use an optimized nest of components that are produced on demand to approach the efficiency of conventional manufacturing on the order of 80%-95% materials utilization.

Figure 5:
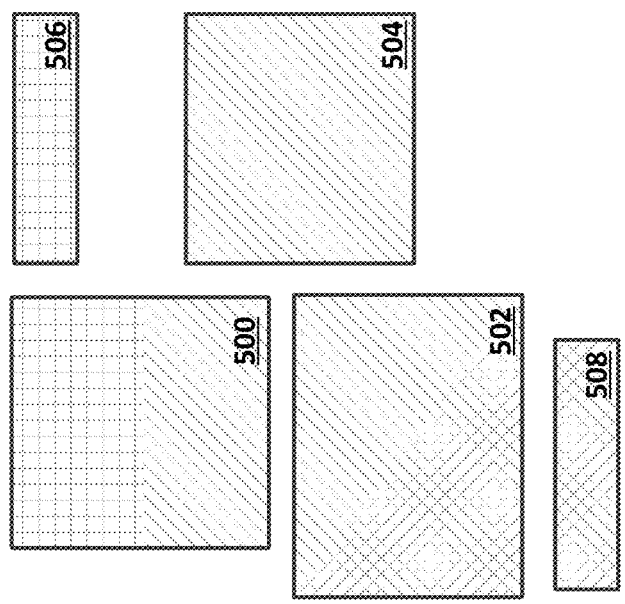
FIG. 5 shows an example diagram of nesting.

FIG. 5 shows an example set of articles of clothing illustrating nesting. A first article of clothing 500 may comprise two sets of colors. A first color may comprise a top half of the first article of clothing 500. A second color may comprise a bottom half of the first article of clothing 500. A second article of clothing 502 may comprise two sets of colors. A top-right half of the second article of clothing 502 may comprise the second color. A bottom-left half of the second article of clothing 502 may comprise a third color. A third article of clothing 504 may comprise one color—the second color. A fourth article of clothing 506 may comprise one color—the first color. A fifth article of clothing 508 may comprise one color—the third color.

Nesting may comprise arranging the articles of clothing 500, 502, 504, 506, 508 such that colors of adjacent borders of the articles of clothing 500, 502, 504, 506, 508 may be similar. The third article of clothing 506 may be arranged to be adjacent to the top half of the first article of clothing 500. The bottom-left half of the second article of clothing 502 may be arranged to be adjacent to the fifth article of clothing. Two or more of the bottom half of the first article of clothing 500, the top-right half of the second article of clothing 502, and the third article of clothing 504 may be arranged to be adjacent.

In an illustrative example, a garment part may be transferred and/or stacked (aggregated) using a mechanical arm (or robot). A plurality of such mechanical arms with the corresponding end-effectors may comprise a pick-and-place production line. The pick-and-place process (involving transferring and stacking) is typically much slower than other processes in the envisioned system and can therefore be considered a "bottleneck". However, the process may be improved with a nesting protocol that considers the specific arrangement and transfer characteristics of the mechanical arms so as to maximize the throughput. A nesting arrangement may change depending on, for example: the fabric characteristics (such as porosity, stiffness, etc); the type of treatments applied to the fabric; the desired web speed; additional operations performed by the mechanical arms; etc. The starting nesting arrangement may be performed by a human or a nesting software. As the pick-and-place process occurs, the mechanical arms may send a feedback to a computer that may result in an altered nesting arrangement maximizing the overall throughput and/or pick-and-place speed.

As an example, parts of a garment may be grouped into sizes, for example: small and large. Thresholds for grouping and the number of groups may be determined for a particular operation or desired output. As far as textile materials are concerned, a different pick-and-place approach may be used for small parts compared to the approach used for large parts. A special nesting may be created that considers various time delays associated with any particular mechanical arm (such as for example, adjusting of the size and arrangement of grippers so that large parts can be picked up immediately after the small parts, etc). The pick-and-place system mentioned above may be configured with nesting optimization to allow the system to handle multiple smaller parts at once or as a series in time. The pick-and-place system may be configured with nesting optimization to handle individual large parts or a mixture of small and large parts. The pick-and-place system may be configured with nesting optimization to maximize the throughput speed and fabric utilization. Other optimizations may be used.

Component Manufacture

Figure 6:
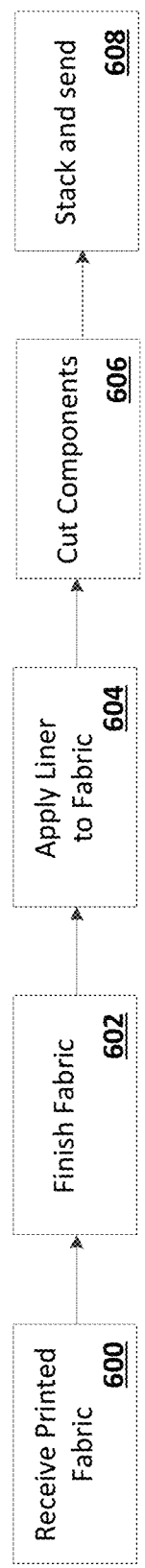
FIG. 6 shows an example diagram of an article management process.

FIG. 6 shows an example diagram of a component manufacturing process. At 600, printed fabric may be received. The fabric may have been printed at the printing step at 158 in FIG. 1. The fabric may have been dried at the post-print drying step at 166 in FIG. 1. The fabric may comprise a custom upper portion of a shoe. The fabric may comprise rows and/or columns, wherein each row and column combination may comprise identical printing. The fabric may comprise a cotton canvas.

At 602, the fabric may be finished. Finishing the fabric may comprise steaming the fabric. The fabric may be steamed at the fixation/steaming step at 170 in FIG. 1. Finishing the fabric may comprise washing the fabric. The fabric may be washed at the post-print washing step at 174 in FIG. 1. Finishing the fabric may comprise drying the fabric. The fabric may be dried at the post-print drying step at 178 in FIG. 1.

At 604, a liner may be applied to the fabric. The liner may be glued to the back of the fabric. The fabric may be printed and finished cotton canvas. Alternative or additional methods may be used.

At 606, components may be cut in the fabric. A laser, router, or knife may be used to cut the components in the fabric. Partial chads may be left in the cut components. Each row and column combination may be completely cut.

At 608, the completely cut fabric (row and column) combinations may be stacked. The completely cut fabric may be stacked such that the partially cut components of one fabric layer line up with corresponding partially cut components of a fabric layer stacked above and/or below. The stacked fabric may be sent to an assembler for assembly.

Color Control

Conventional coloration methods are largely dependent on manual processes with multiple, time-consuming iterations through a extended period of trial and error. The present disclosure may combine precision substrate characterization data, chemical profiles from inks by color, and precision wet finishing data to preempt the extended trial and error process.

Conventional design tools are fragmented, incompatible, and in many ways completely ring-fenced from the manufacturing process, necessitating an extended trial and error process to produce as designed, creating the need to create changes to original design to manufacture. The present disclosure comprises an integrated manufacturing job file creation function that presents customers, designers and other end users only achievable design and material attributes, excludes colors and characteristics that are untenable within allowed performance attributes and standards, thereby seamlessly creating a manufacturing job file directly from the inputted design.

Typically conducted as a separate ad hoc process as a post processing QA/QC function—it takes too long and happens too far from the coloration process. Other manufacturers fail to integrate data up and downstream in the value chain, i.e. desired end-color, substrate construction and follow-on wet processing and lamination processes. The present disclosure may integrate this into our inline coloration and fixation processes to more proactively inform color-matching and repeatability.

Pretreatment

Foam Application

In the direct-to-fabric digital printing of the textiles Industry, pre-treatment chemistries are applied to textiles in open width form through a process referred to as padding whereby the entire textile is dipped in chemistry and the excess is squeezed out prior to drying/fixing of the chemistry. Under the conventional process, the amount of moisture absorbed by the textile can range from 70% to >100% of the weight of the textile (referred to in the industry as "Wet Pick Up"), and all of this moisture must be evaporated in an energy intensive process when drying the textile prior to subsequent processing. The other problem with conventional padding of pre-treatment chemistry is that chemistry is applied on and through the entire textile when in most cases the chemistry is only needed on the surface that will be printed. Therefore, the conventional process requires the use of more energy, water, and chemistry than is needed to add value in subsequent processes. The textile industry is the second largest consumer of fresh water in the world, and one of the largest polluters of surface water after the agricultural industry. The industry is seeking novel ways to reduce water, energy and chemical consumption.

Foam application of chemistry has been in commercial use for several decades. In the nascent industry of direct to fabric digital printing, production speeds are increasing to a level where the industry is growing at a fast rate and gaining attention from the investment community. In the present disclosure, a process comprises pre-treatment chemistry applied via foam applicator which has several benefits of importance to the textile industry, for example: reduced energy Consumption, reduced water consumption, reduced chemical consumption, more accurate application of chemistry where it is needed, reduced chemical load on wastewater treatment systems. It has also been demonstrated that deeper, richer colors can be achieved through the foam application process versus conventional process.

Figure 7A:
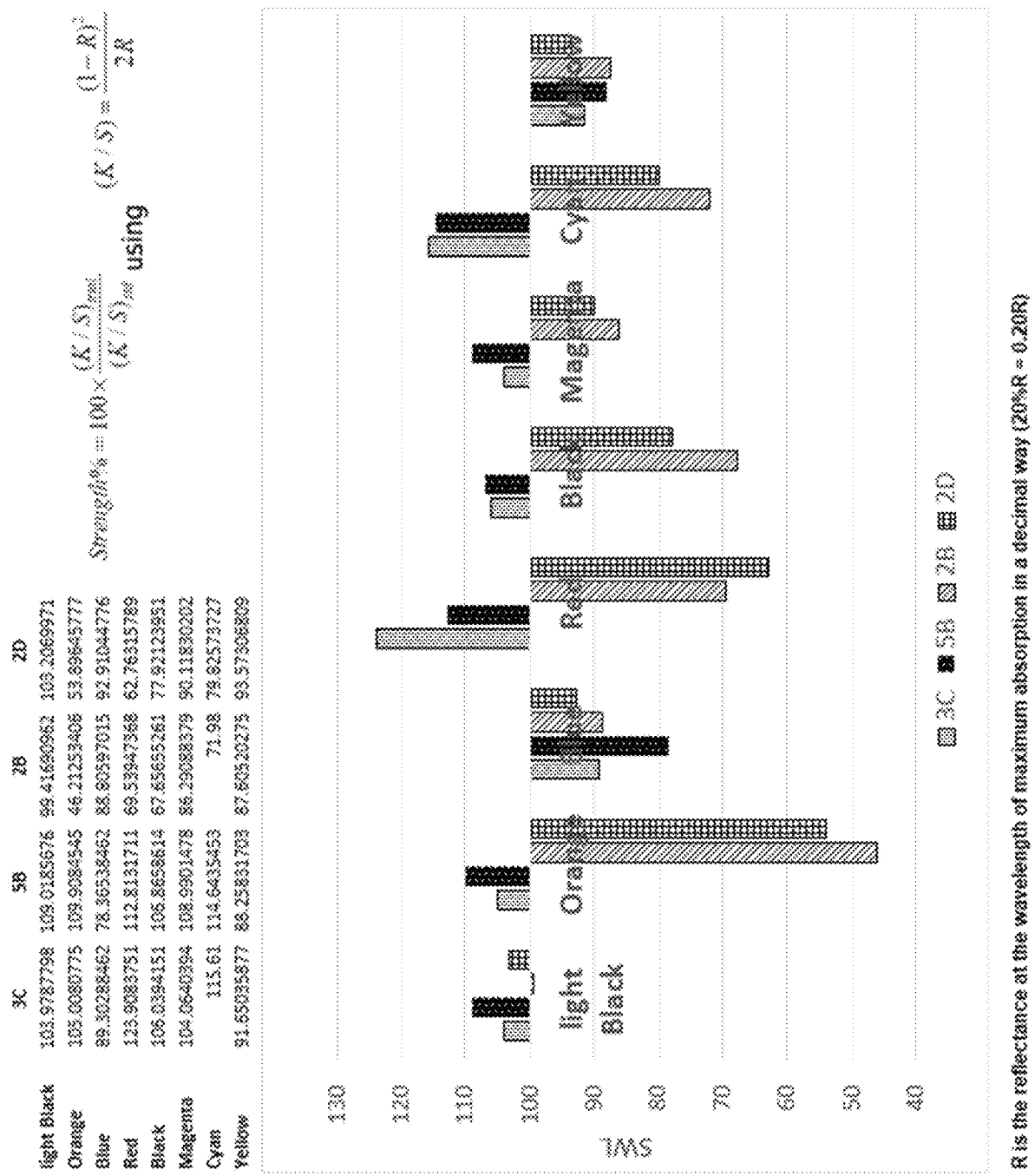
FIG. 7A is example data based on a treatment of the present disclosure.

FIG. 7A shows positive results from foam-applied pre-treatment across four preliminary chemical formulations. These preliminary formulations demonstrate higher average results in a number of categories compared to the average results in control cases or conventional processes. R is the reflectance at the wavelength of maximum absorption in a decimal way (20% R=0.20R)

All 4 samples (3C, 5B, 2B & 2D) are foam applied and the results compared with the corresponding conventional padded or pad-applied sample. For example samples 3C and 5B were compared with padded sample (Pad 1 below) and 2B and 2D were compared with another padded sample (pad 2 below)

SWL value >100% associated with the foamed samples means that higher color yield was achieved by that foam formulation and conditions, compared at least to the conventional samples.

FIG. 7B illustrates positive results with four different chemical formulations, where 2B and 2D demonstrate a performance outcome similar to baseline control case, 3C and 5B demonstrate improved performance over the results of the control and other formulation variables.

The present disclosure comprises formulations for foam treatment, such as the following (although other chemistries may be used):

Pad 1

| Urea | 10% | 100 g/kg |
| Alkali (Sodium carbonate) | 1% | 10 g/kg |
| Migration inhibitor (Thermacol MP) | 10% | 100 g/kg |

Pad 2

| Urea | 10% | 100 g/kg |
| Alkali (Sodium Carbonate) | 2% | 20 g/kg |
| Migration inhibitor (Prepajet Uni) | 8% | 80 g/kg |
| Reduction inhibitor (Lyoprint RG) | 2% | 20 g/kg |

Foam treatment for Durable Water Repellant (DWR) may be used. As an example, FIG. 7C shows a DWR formulation with specific parameters for foam application onto a polyester substrate whereby performance improvements are demonstrated to produce a 50% reduction in chemistry savings combined with a possible 80-85% reduction in chemistry consumption.

Figure 7D:
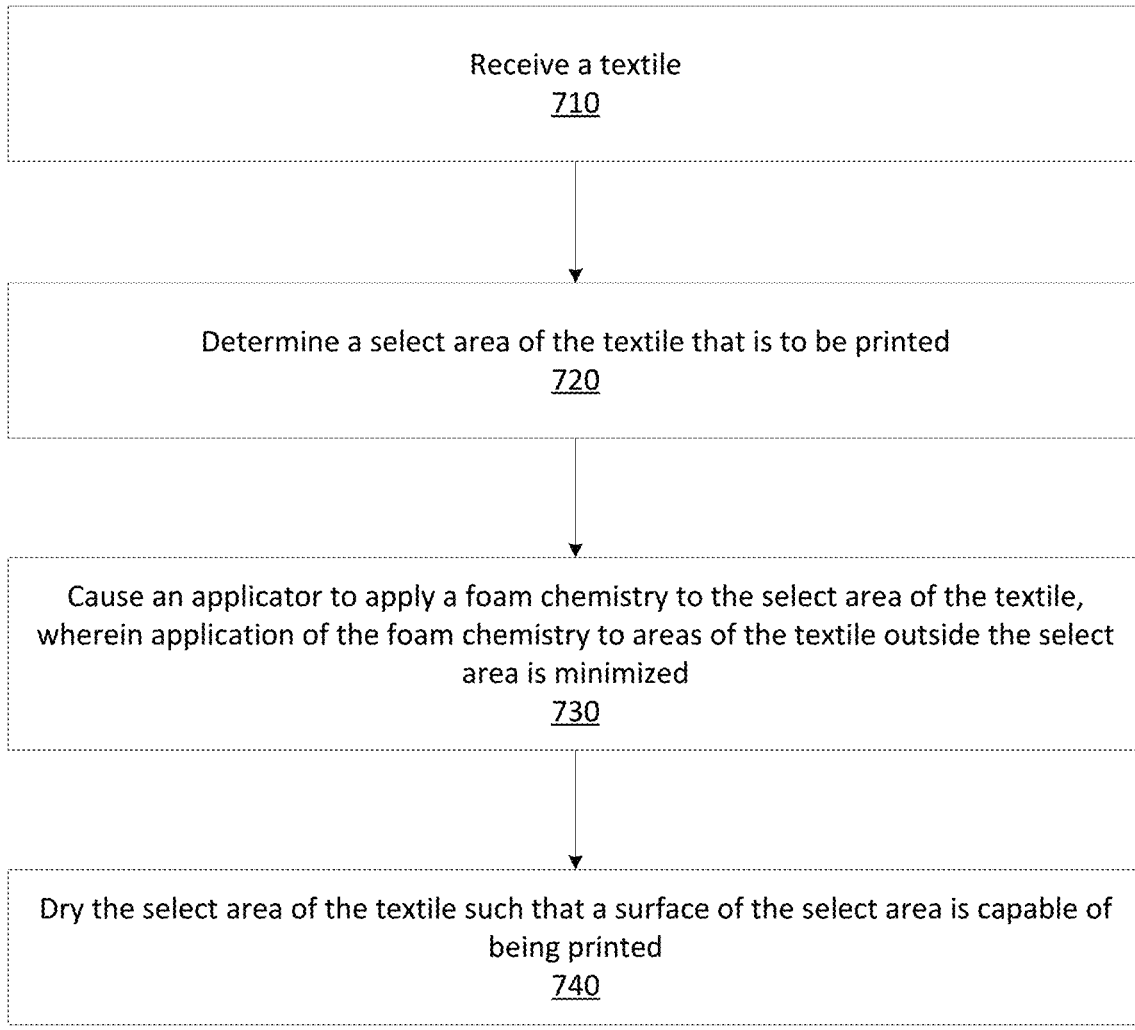
FIG. 7D is a flow diagram of an example method.

Referring to FIG. 7D, a method for pretreating textile is illustrated. At step 710, a textile may be received. A materials manufacturer may receive a textile. The step 138 in FIG. 1 may comprise the step 710.

At step 720, a select area of the textile that is to be printed may be determined. A materials manufacturer may determine a select area of the textile that is to be printed. The step 140 in FIG. 1 may comprise the step 720.

At step 730, an applicator may be caused to apply a foam chemistry to the select area of the textile. A materials manufacturer may cause an applicator to apply a foam chemistry to the select area of the textile. Application of the foam chemistry to areas of the textile outside the select area may be minimized. The step 140 in FIG. 1 may comprise the step 730.

At step 740, the select area of the textile may be dried such that a surface of the select area is capable of being printed. A materials manufacturer may dry the select area of the textile such that a surface of the select area is capable of being printed. The step 140 in FIG. 1 may comprise the step 740.

A materials manufacturer may receive a textile and a corresponding job file. The job file may indicate that a particular area of the textile should get printed. The materials manufacturer may cause the particular area of the textile to receive a foam pretreatment. The materials manufacturer may dry the particular area of the textile. The materials manufacturer may cause the particular area of the textile to be printed as dictated by the job file.

Plasma Pre-Cleaning/Activation

Textile materials must be thoroughly cleaned in order to optimize the wettability and adhesion of chemistry (e.g. Durable Water Repellant finishes, colorants, polymer coating, lamination etc.). As environmental restrictions have intensified over the use of solvents and surfactants, it is increasingly difficult to achieve the same level of cleanliness obtained with the aggressive chemicals of the past (e.g. solvents). Most cleaning of textiles today is water based using a great deal of heat energy and the most benign detergent chemicals possible. Unfortunately, the modern cleaning systems, while environmentally friendly do not leave the textiles free of contaminants that can interfere with the coloration and finishing of textiles. Applying chemicals to contaminated fabrics often leads to poor performance, poor durability of functional finishes, or the need to use more chemistry to achieve a passing rating than would be needed if the fabric were completely clean. Atmospheric plasma treatment can change the surface chemistry and topography of fabric and/or materials to improve adhesion properties to different materials. Each plasma carrier gas can provide different surface chemistry and surface topography.

In accordance with the present disclosure, a corona plasma process may use ionized gases to vaporize remove (decompose) contaminants (oils, waxes, etc.) on the surface of a textile. It is a waterless process and results in a cleaner surface that is easier to 'wet out' by changing surface chemistry and surface energy of the fabric and or material with water based chemistries. A corona plasma unit can be placed prior to the chemical application step to aid in chemical penetration (wettability) as well as activation of the textile surface. Plasma can be used to increase the performance of some chemical applications (e.g. DWR) as well as achieve deeper, more saturated colors, using less dyes and chemicals.

Figure 8:
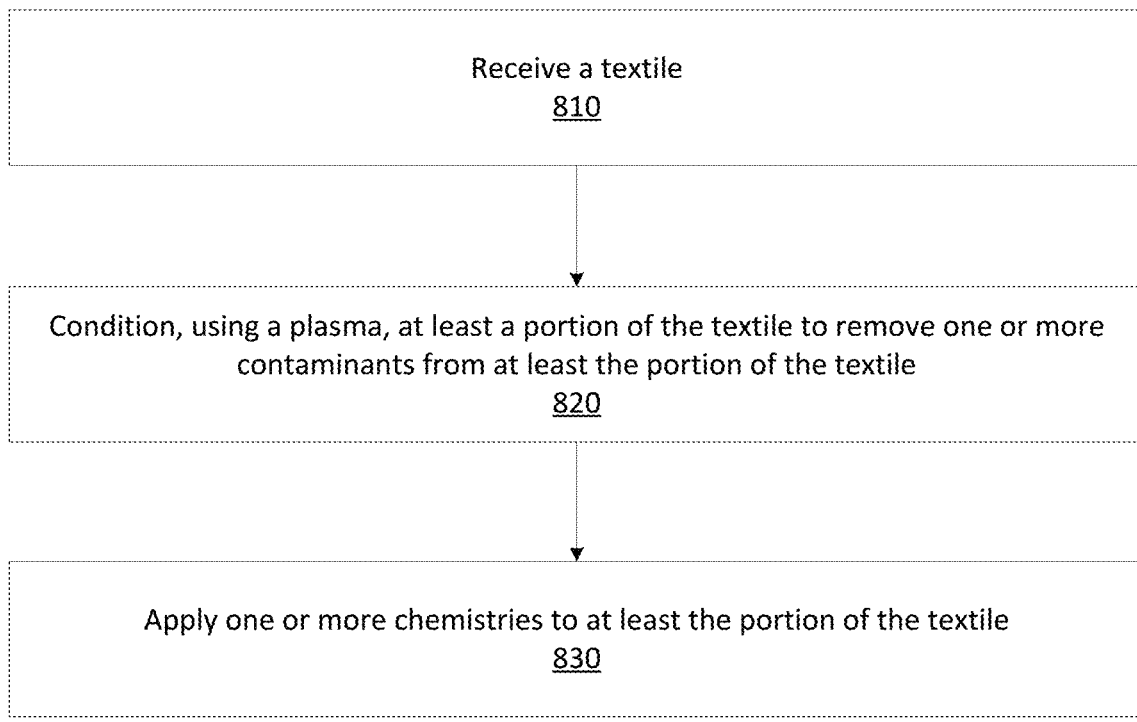
FIG. 8 is a flow diagram of an example method.

Referring to FIG. 8, a method for pretreating textile is illustrated. At step 810, a textile may be received. A materials manufacturer may receive a textile. The step 138 in FIG. 1 may comprise the step 810.

At step 820, at least a portion of the textile may be conditioned to remove one or more contaminants from at least the portion of the textile using a plasma. A materials manufacturer may condition at least a portion of the textile to remove one or more contaminants from at least the portion of the textile using a plasma. The conditioning at least the portion of the textile may activate a surface of the textile. The plasma may comprise a corona plasma. The step 140 in FIG. 1 may comprise the step 820. The step 146 in FIG. 1 may comprise the step 820.

At step 830, one or more chemistries may be applied to at least the portion of the textile. A materials manufacturer may apply one or more chemistries to at least the portion of the textile. The step 140 in FIG. 1 may comprise the step 830. The step 146 in FIG. 1 may comprise the step 830. Activation of the surface of the textile may improve a performance of the one or more chemistries as compared to an unactivated surface of the textile with the same one or more chemistries applied thereto.

A materials manufacturer may receive a textile with contaminants on a particular area of the textile. The materials manufacturer may remove the contaminants by using plasma on the particular area. The materials manufacturer may apply one or more chemistries to the particular area of the textile to activate the particular area of the textile.

Digital Coloration

Drop-On-Demand (e.g., Digital Printing)

In the apparel industry, conventional products are currently manufactured under a forecasted model where wholesalers and retailers place orders for apparel & footwear against a forecast prior to a consumer actually purchasing the end product. Under this scenario, products are manufactured using large batches of inputs (e.g. materials such as textiles) that are successively broken down into smaller and smaller batches until the final process whereby the end product is complete as a 'batch of 1' unit, an illustrative example shown in FIG. 9B. Under this system, the unique identifier for the final product is not assigned until the very last step in the process. In one scenario where products will be manufactured under a 'mass customization' model—the consumer may purchase the end product prior to its manufacture. Under this model, it is critical that each component of the end product be identified throughout the manufacturing process in order to keep track of the order from inception to delivery. Identifying each component can be generated at the digital printing step using unique identifiers such as barcodes or QR codes. However, most consumers do not want to see the unique identifiers on the final product, an illustrative example show in FIG. 9B. In addition, material utilization is a key driver of the efficient and sustainable use of raw materials. In order to solve the identification problem while not using excessive material, the unique identifiers need to be placed on each component in a legible way, but without being visible to the consumer.

In the present disclosure, quality control may be implemented via invisible registration points, such as using an invisible ink that may be viewed via computer vision or some other process. The present systems and methods may embed data through unique dithering pattern. For example, the present disclosure comprises the application of unique identifiers (e.g. Bar Codes, QR Codes, illustrative example shown in FIG. 9B) using methods that are 'invisible' to the consumer, while being readable for the manufacturing process from digital printing through point of sale. The present disclosure comprises the use of unique identifiers that are applied to each component using invisible ink that is readable by machine vision, but using ink that is outside of the visible spectrum of human perception (e.g. Ultraviolet, infrared, etc.).

Attribution and Traceability

In the apparel industry, 'at scale' industrial production does not support digital bespoke manufacturing driven by consumer generated or aggregated content. In order to manage unique, single unit workflow that can be used for making claims and proving provenance of product and components, requires a digitally generated marking system for every textile component that can be tracked from the point of generation through to point of sale, whereby the marking can be linked to the entire value chain through a manufacturing integration and intelligence system. In the present disclosure, the systems and methods may embed customer order data with visible and non-visible attribution via digital printing using visible and/or non-visible codes.

A method for attribution and/or traceability may comprise receiving order data associated with one or more first consumer orders. One or more unique identifiers (UIDs) may be disposed on at least a portion of a material. The one or more unique identifiers may be invisible to a human eye and visible with the aid of a predetermined vision method. The one or more unique identifiers may represent article data comprising at least a portion of the order data. One or more methods may comprise processing, via one or more manufacturing processes, the material to form at least a portion of an article. The article data represented by the one or more unique identifiers may be updated based on each manufacturing process to comprise information associated with the respective manufacturing process. Each of (or one or more of) the manufacturing processes may comprise reading the article data and adjusting one or more actions associated with the respective manufacturing process based on the article data. The article data may indicate a provenance of the article. As used herein, article data may be or comprise other data such as nesting data, order data, color data, etc.

A method for attribution and/or traceability may comprise receiving order data associated with one or more first consumer orders. One or more unique identifiers may be disposed on at least a portion of a material. The one or more unique identifiers may be visible to the human eye and configured to be concealed via one or more manufacturing processes. The one or more unique identifiers may represent article data comprising at least a portion of the order data. Other data may be represented. One or more methods may comprise processing, via the one or more manufacturing processes, the material to form at least a portion of an article and to conceal at least a portion of the one or more unique identifier. The article data represented by the one or more unique identifiers may be updated based on each manufacturing process to comprise information associated with the respective manufacturing process. Each of (or one or more of) the manufacturing processes may comprise reading the article data and adjusting one or more actions associated with the respective manufacturing process based on the article data. The article data may indicate a provenance of the article.

Digital marking of apparel/footwear components requires unique markers and/or serialized unique markers (e.g., FIG. 9B) that are sufficiently large enough to be legible via machine vision in order to enable automated manufacturing (reliable legibility). The size of digital markers vary by substrate—e.g., very flat, even substrates can be marked with smaller markers due to the physics of the flatter surface, whereas substrates with a larger degree of Z direction texture (e.g. seersucker weave, waffle knit) require relatively larger markers due to the physics of the light reflecting off the substrate surface. In the present disclosure, an MII (Manufacturing Integration & Intelligence System) may generate unique digital identifiers (e.g. QR Code, Bar-Code) that are generated to be reliably legible depending on the data collected on the given substrate. The present disclosure may automatically select the appropriate sized marker based on the substrate data and the size of the printed component.

Current product storytelling requires months or years of planning with the upstream supply chain whereby proving the provenance of inputs (for example, organic content, recycled content) is managed through underwriting or legal documentation to manage risk as opposed to a defined, digital chain of custody. As the market moves towards smaller batch sizes, and higher degrees of customization, it becomes increasingly difficult to trace inputs and processes to make marketing claims. The systems and methods of the present disclosure may generate unique identifiers that can be accessed digitally (e.g. QR Codes, Bar Codes) to connect the consumer with the history and provenance of the end product whereby the inputs and 'ingredients' are compiled as the product moves through the supply chain and will be accessible to the end consumer through interacting with the unique identifiers (e.g. through mobile devices, scanners, digital cameras, etc.).

In the apparel and footwear industries, textile substrates, while being 'engineered' materials, can have a large degree of variation in dimensional change of the substrate through steps in the manufacturing process, particularly in the finishing stage of processing. The dimensional change can be the result of various factors: changes in moisture/wetting of material; mechanical forces in wet and dry processing such as stretching or compacting of material; permanent/semi-permanent changes in thermoplastic substrates as the result of thermal fixation (heat setting), application of chemistries (e.g. coatings, etc.). Dimensional changes manifest not only at the macro level (batch to batch) but also at the micro level within a single yard or meter of a substrate making localized predictions of dimensional change unpredictable. Because of aforementioned dimensional changes, the relationship of registration marks for the cutting process of individual components (applied in previous processes, for example on a digital printer) can shift significantly through processing such that cutting based off of the initial design dimensions will result in components that out of specification. To solve this problem, a much more robust process for identifying dimensional change prior to cutting is necessary in order to provide accurate cutting and also provide a data feedback loop to improve prediction of dimensional change and/or identify quality issues using machine vision. Adding dimensional reference points across the width and length of a textile web is critical. Placing high density reference marks on a an end product is not commercially acceptable to the consumer, so marks that are invisible to consumers (outside of the visual spectrum) yet visible to machine vision is critical for high speed single ply cutting of textiles. Markers that are large enough to be reliably detected would likely be objectionable to the average consumer if said markings were visible on every component of an apparel/footwear product. In the present disclosure, invisible ink may be used to create registration points that track changes to the original pattern as a quality control measure. This can be corrected within cutting process or the order will be referred back to the queue in a preformatted job file to reproduce.

Conventional components are generally cut from monolithic prints—this creates wasted ink, finishes, and adds difficulty to recycling unused material (e.g., fabric or other components). In the present disclosure, precision application of finishing to allow for the recycling of unused fabric Adhesives are traditionally applied monolithically and in an analog manner. This creates a high level of waste in both expenditure of excess chemistry and prohibits the ability to recycle unutilized material (e.g., fabric or other components). The present disclosure may utilize digital printing/extrusion of adhesives, using proprietary formulation, to apply chemistry only where needed. The platform may identify visual registration points, reference to layers in a digital tech pack database, and use precision application of chemistry only to the necessary areas of the respective component-level (or engineered) print.

Figure 9A:
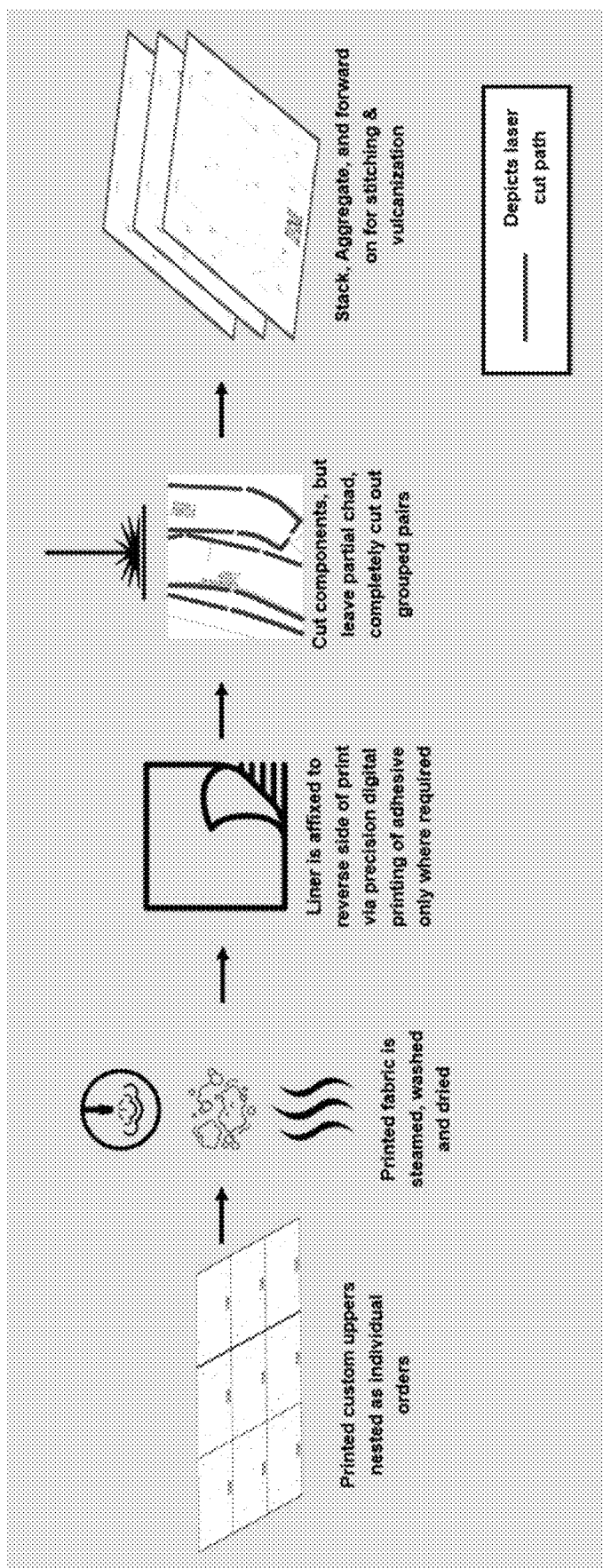
FIG. 9A is a flow diagram of an example method.
Figure 9B:
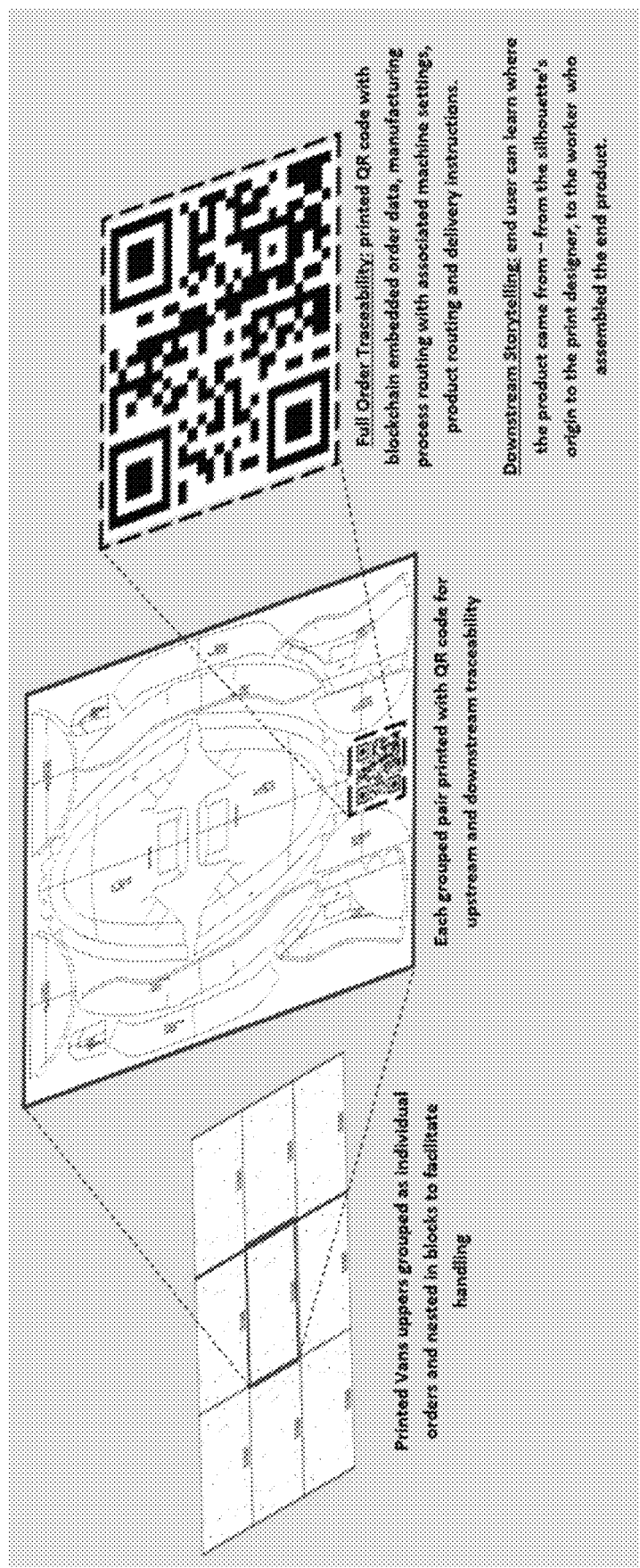
FIGS. 9B-9E illustrate example traceability mechanisms.
Figure 9C:
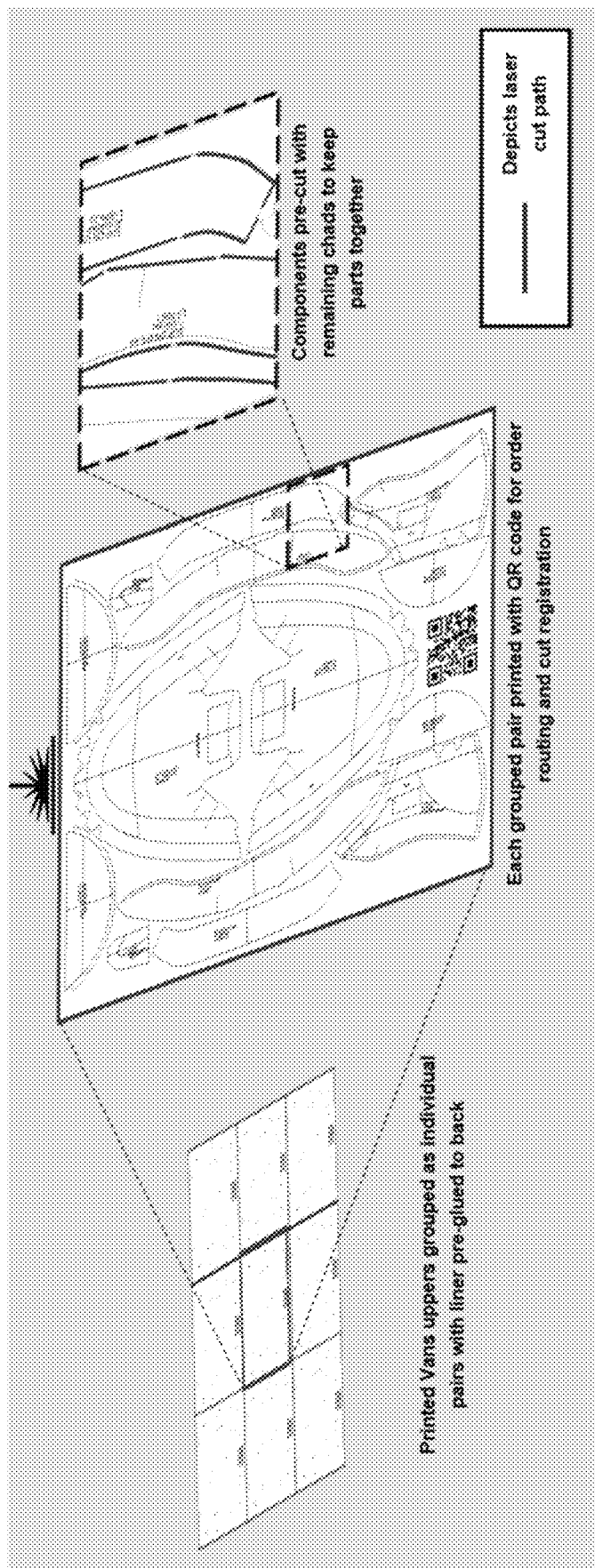
Figure 9D:
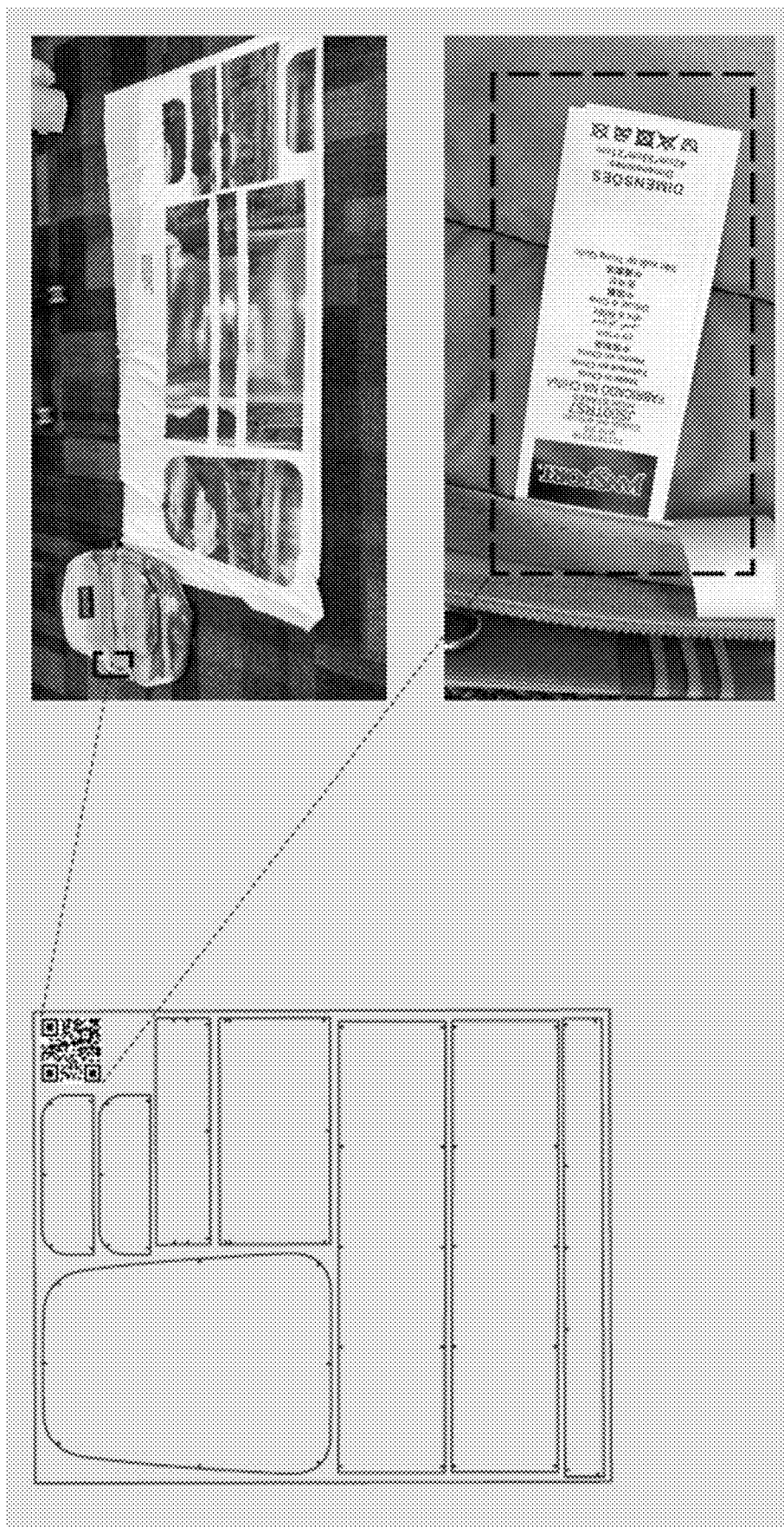
Figure 9E:
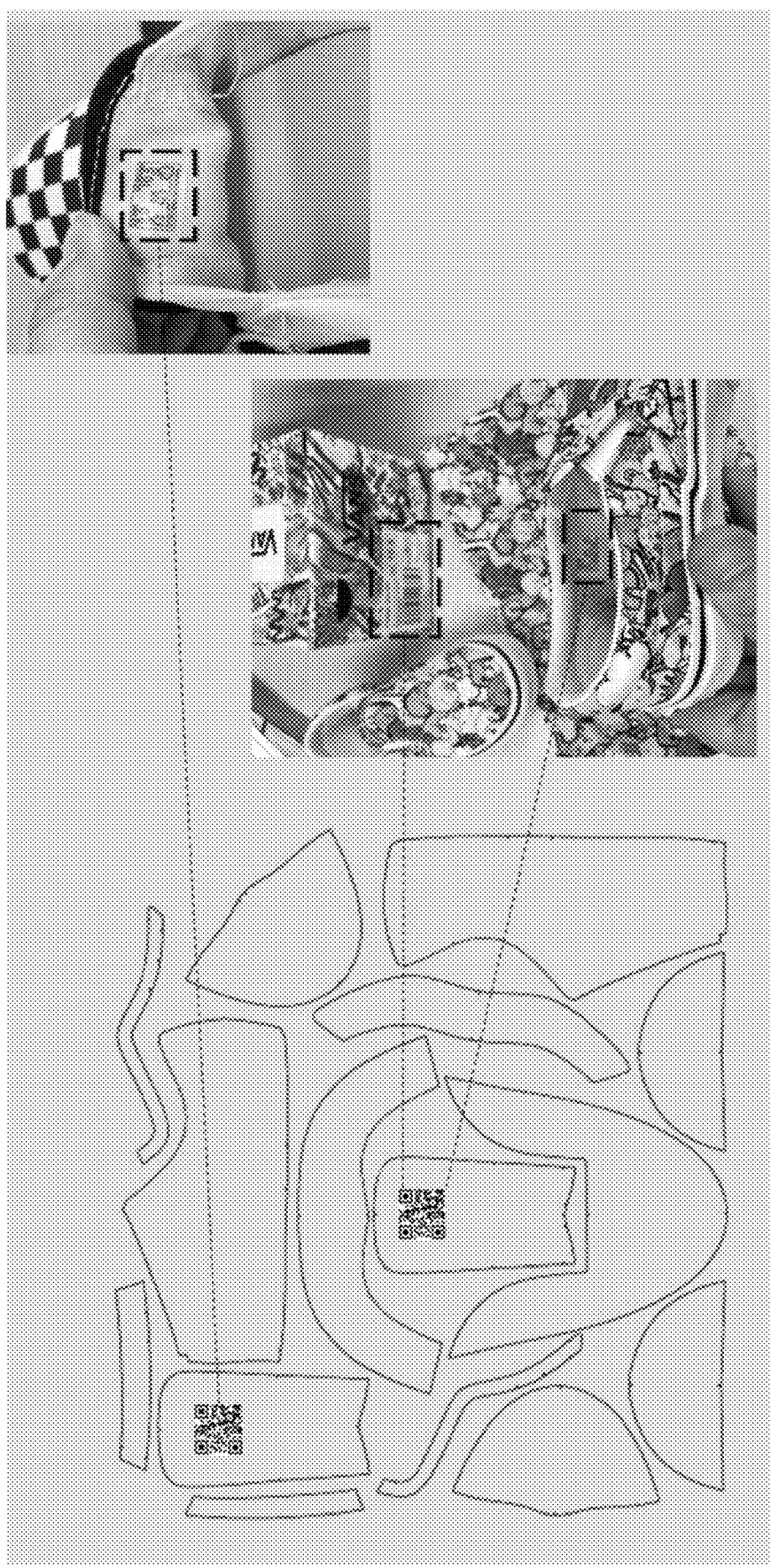

FIG. 9A presents an illustrative example of component level printing, combined with precision laser cutting, to facilitate ease of assembly and automation. The demonstration of component level engineered printing, nested as pairs and batched according to downstream processing, enables flexibility in downstream sewing and assembly—where benefits may be realized in the printing of the order, whereas the downstream sewing and assembly is largely commoditized in practice. FIG. 9B demonstrates an example, vis a vis QR code, for up and downstream traceability. QR code is representative of dithering patterns and 'invisible' in formulations to contain underlying data for the purposes of supply chain sustainability and CSR, to facilitate manufacturing through shipping process, as well as creating an opportunity for marketing and attribution. FIG. 9C shows incremental improvements demonstrated in diagram, e.g. precision cuts to leave remaining uncut chads, translates to material savings in direct labor costs, while increasing underlying product quality and consistency compared to existing manufacturing methods. FIG. 9D-E demonstrate an example of traditional manufacturing processes eliminated by the operationalization of engineered printing and digital manufacturing writ large. In this case, the simple replacement of tag (with applicable care and sizing information and requisite country of origin data) with digitally printed information eliminates direct labor costs attributed to the item's manufacture, while also presenting an opportunity to prevent a countermeasure against fraud and circulation of counterfeit goods.

Alternatively or in addition to being used as carriers of information, UIDs can also be used to "grade" or evaluate a process step or processes. For example, if a particular UID has a reflective property then measuring the reflectivity prior to the PU coating application ("the process") and again after the completion of the process would yield "local" or garment-part-specific information about the thickness and/or quality of the applied PU coating. In other instances, the UIDs would themselves undergo change (for example, a color change or visibility change corresponding to a maximum and/or minimum temperature used in the process or indicating a particular temperature range). Evaluation of other production process properties could be envisioned. These UIDs can be applied within the seam allowance of each garment part and/or within a gutter region of a fabric roll.

Wet Finishing

Figure 10:
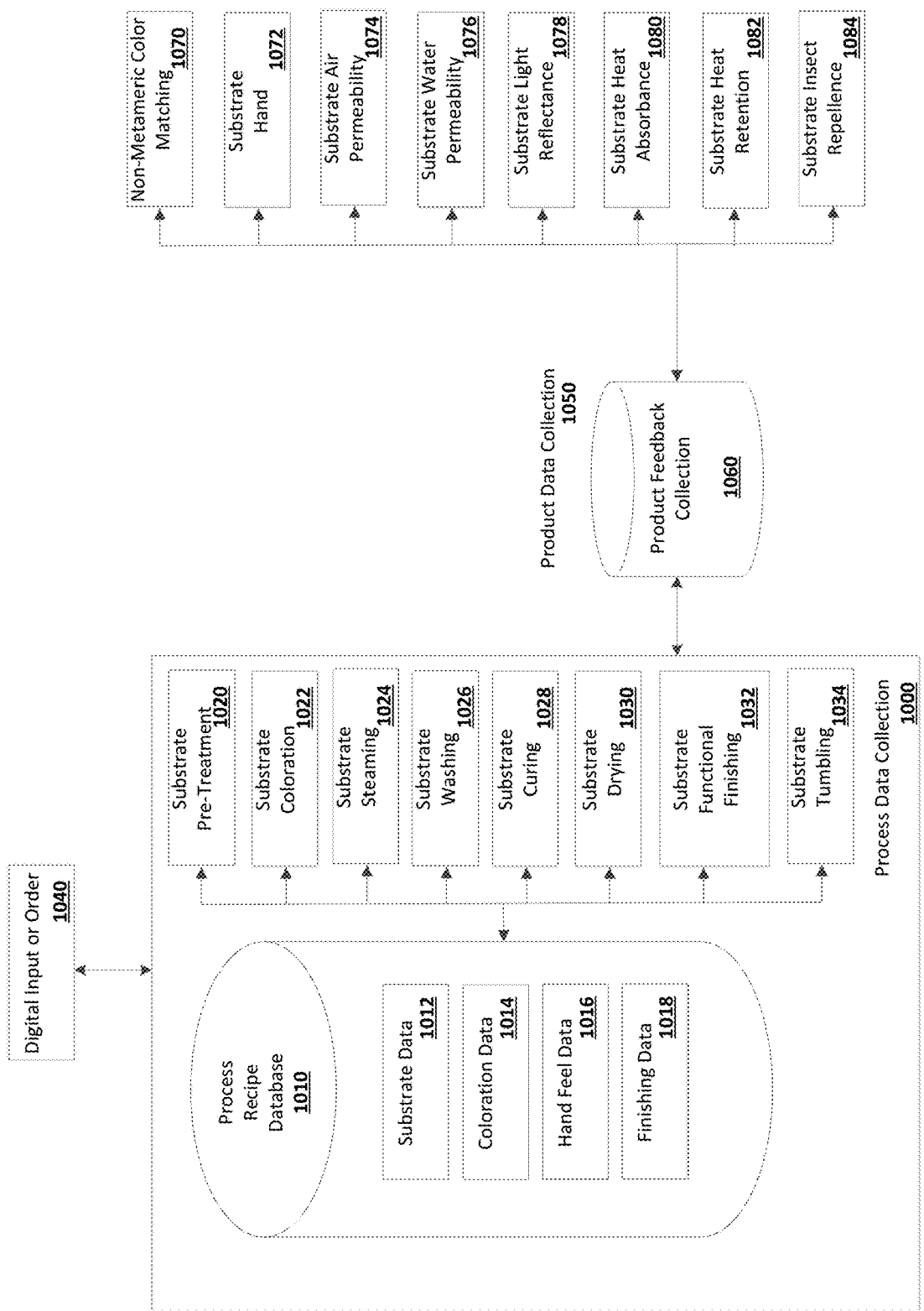
FIG. 10 is a process diagram.

Conventional finishing processes are generally fragmented processes, physically and digitally separate from the printing process. The current state presents an extremely long feedback loop. Currently manually executed with high degree of variance (especially from one site to another). In the present disclosure, in-line spectrophotometer may be implemented to measure variance and create algorithm to optimize settings for on-premises and networked manufacturing. For example, the systems and methods may use aggregated data to create baseline recipe that can be adjusted for other manufacturing sites and their respective conditions, i.e. water quality, chemistry, ambient conditions, etc. read data from previous process and setting, then write conditions from this part of the process FIG. 10 shows an example diagram of a wet finishing process. The wet finishing process may comprise a process data collection 1000 and a product data collection 1050. The process data collection 1000 may receive and/or extract data from a digital input and/or order 1040. The process data collection 1000 may be in communication with the product data collection 1050.

The process data collection 1000 may comprise a process recipe database 1010. The process recipe database 1010 may comprise substrate data 1012, coloration data 1014, hand feel data 1016, finishing data 1018, etc. The process data collection 1000 may comprise data regarding various process steps, such as a substrate pre-treatment step 1020, a substrate coloration step 1022, a substrate steaming step 1024, a substrate washing step 1026, a substrate curing step 1028, a substrate drying step 1030, a substrate functional finishing step 1032, a substrate tumbling step 1034, etc. Data regarding the various process steps may be obtained from a sensor. Data regarding the various process steps may be obtained from a spectrometer. Data regarding the various process steps may be obtained from an inline spectrophotometer. The inline spectrophotometer may measure variance in the data regarding the various process steps. Measured variances in the data regarding the various process steps may be used to create an algorithm to obtain more optimal settings. The process data collection 1000 may comprise settings and/or conditions. The settings and/or conditions may be attributed to direct performance outputs. The settings and/or conditions may be associated with an in-line dryer, a steamer, a washer, a Stenter Frame, etc.

The product data collection 1050 may comprise a product feedback collection 1060. The product feedback collection 1060 may comprise data regarding various aspects of a product, such as non-metameric color matching feedback 1070, substrate hand feedback 1072, substrate air permeability feedback 1074, substrate water permeability feedback 1076, substrate light reflectance feedback 1078, substrate heat absorbance feedback 1080, substrate heat retention feedback 1082, etc. Data regarding the various aspects of the product may be obtained from a sensor. Data regarding the various aspects of the product may be obtained from a spectrometer. Data regarding the various aspects of the product may be obtained from an inline spectrophotometer. The inline spectrophotometer may measure variance in the data regarding the various aspects of the product. Measured variances in the data regarding the various aspects of the product may be used to create an algorithm to obtain more optimal settings. The product data collection 1050 may comprise settings and/or conditions. The settings and/or conditions may be attributed to direct performance outputs. The settings and/or conditions may be associated with an in-line dryer, a steamer, a washer, a Stenter Frame, etc.

Digital Finishing

Component-Level Application of DWR (e.g., Fluoro Free or Conventional Fluoro)

Conventional DWR processes are conducted in batches with monolithic application of chemistry whereby the chemistry is applied across the entire web of textile material with the same level of application across the entire surface. The problem with this approach is that chemistry is used across material that ends up as waste, and there is no way to control the level of repellency in an 'engineered' approach to generate new performance applications. In the present disclosure, digital application of DWR at component level and in roll-to-roll process will allow for engineered patterns of moisture management that can be digitally enabled. This will lead to a more sustainable process whereby less chemistry is used to create performance. Also, fabric that ends up as waste after the cutting process can more easily be recycled due to that waste being free of chemistry contaminants. Also, with the digital application of the chemistry, new performance functions can be enabled by the engineered placement of chemistry that can be scaled across different sized components to enable single unit customization.

Engineered Application of Chemistry

Convention application of chemistry covers all of fabric, creating significant waste in chemicals, and prevents recycling of un-utilized fabric. In the present disclosure, precision digital application of chemistry such as adhesives may reduce chemical use, save costs, and allow for recycling of unused fabric.

Cutting

Typical conventional methods cut pre-programmed patterns from a monolithic print, necessitating repeats of set component patterns and leads to wasted ink and impedes scaled customization. In the present disclosure, dynamic recognition of cut patterns allows for increased overall throughput, reduced waste, and mass customization.

Figure 11:
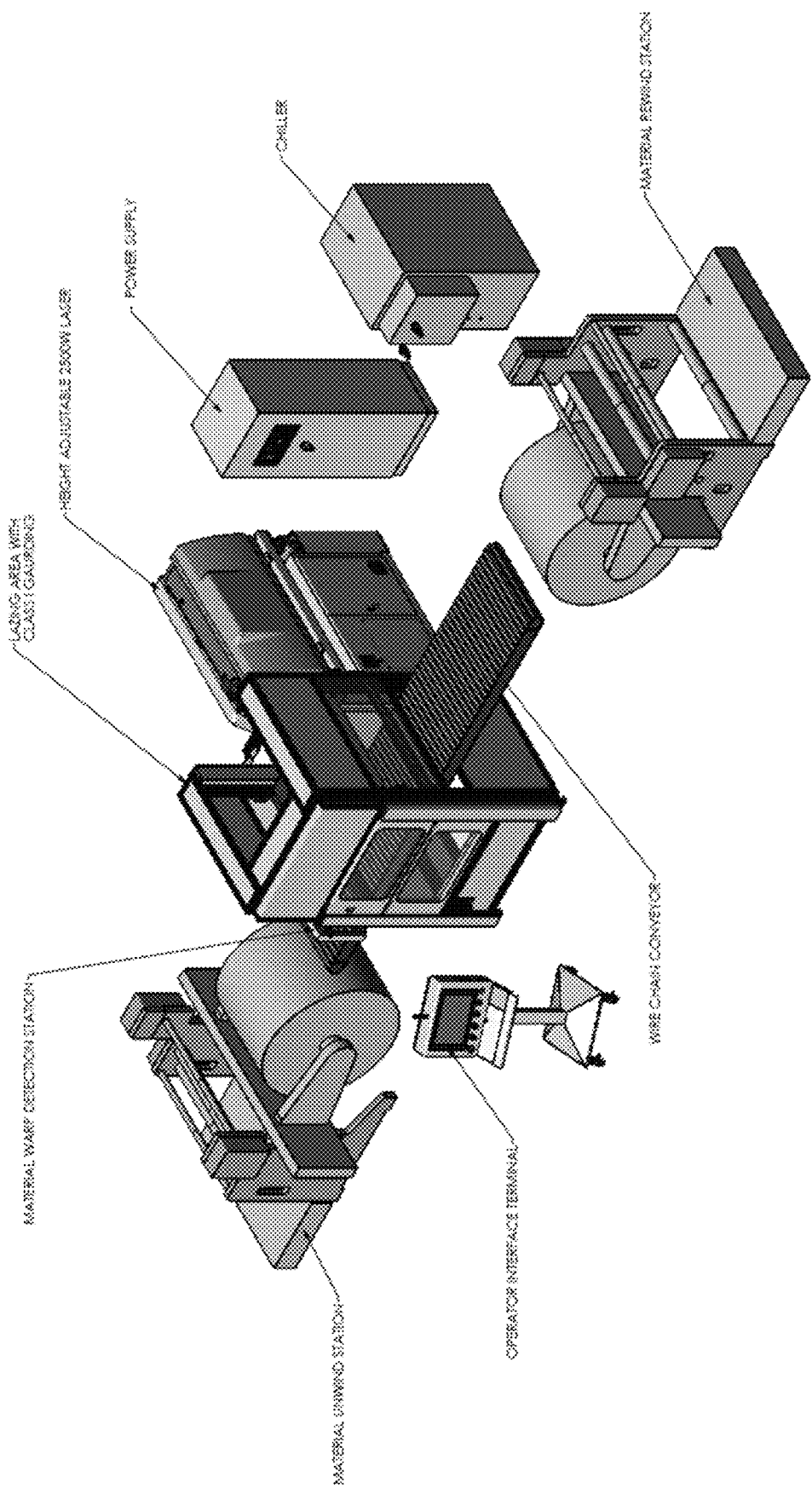
FIG. 11 illustrates an example system.

Current automated single ply cutting in the textile material industry does not have sufficient throughput to scale in the apparel/footwear industry. Conventional technologies utilize gantry driven X/Y axis equipment, generally with a mechanical knife and on occasion with laser energy. The systems and methods of the present disclosure may utilize high speed galvanometer driven lasers which have a throughput that is 2 orders of magnitude higher than gantry driven systems. FIG. 11 illustrates a design for an early high-speed single-ply galvanometer driven laser cutting prototype to far surpass existing conventional textile cutting methods.

Figure 12:
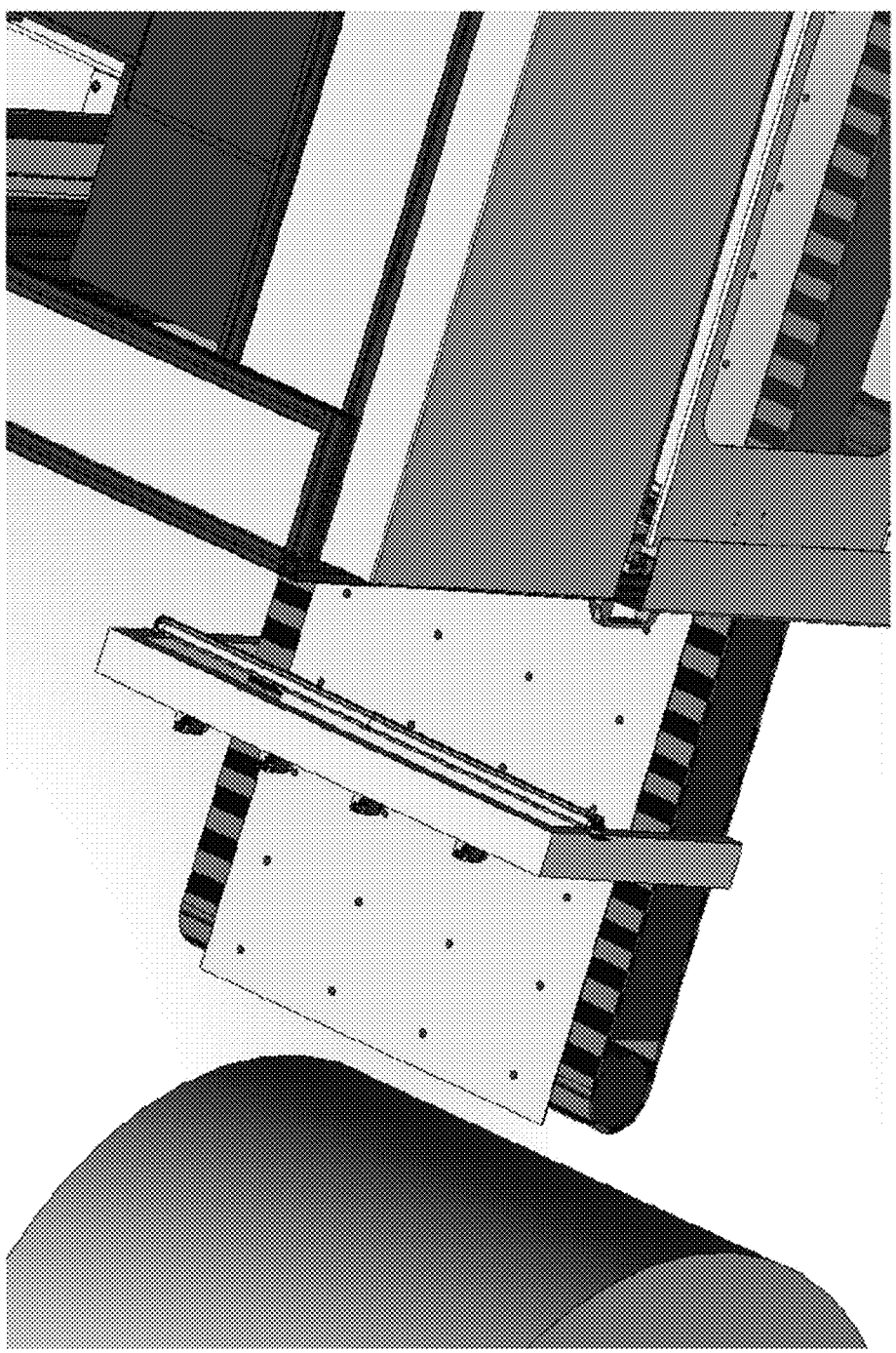
FIG. 12 illustrates an example system.

Traditional wet finishing processes such as post-print steaming, washing, and stenting create distortion in fabrics that are non-linear and difficult to predict consistently (particularly on knits). These distortions prevent the ability to consistently print both patterns and components with precision. The systems and methods of the present disclosure may match a database of pre-graded component shapes and patterns and make cut adjustments to correct for observed shape distortions while tuning recipe changes for the next print iteration. FIG. 12 an infeed portion of the FIG. 11, where vision recognition and real-time job file correction data is collected and transmitted.

Figure 13:
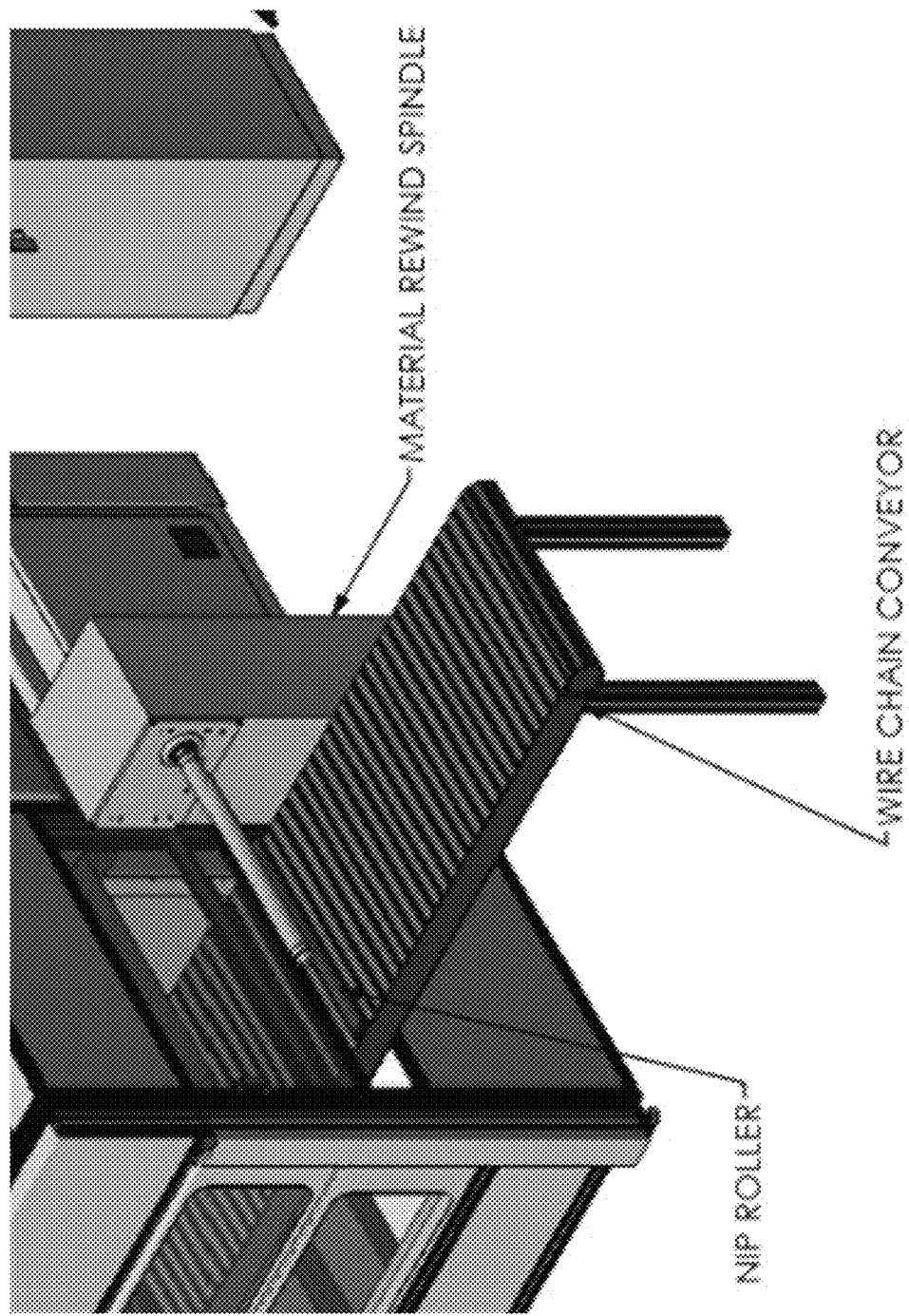
FIG. 13 illustrates an example system.

Printing at the component level creates inefficiencies in down process sorting and handling where engineered print components are indecipherable from waste. The systems and methods of the present disclosure may nest prints and cut components such that unused substrate remains attached as a web. This web of unused substrate is wound up from the belt, leaving the relevant cut components to be sorted kitted and assembled, with the waste effectively batched and recycled. FIG. 13 illustrates a nip roller for waste removal and subsequent downcycling or recycling.

Conventional cutting methods include cutting components by hand with mechanical tools in analog function or automatic cutting of material using a gantry driven knife, router, or laser. This labor intensive process creates outsized inefficiencies for customization in particular. The systems and methods of the present disclosure provide nesting by unique customized order, batching, and precision laser cutting to leave connecting chads to keep together enabling hand separation from block.

A method for cutting registration may comprise analyzing, using computer vision, a first pattern configuration disposed on printed material. One or more methods may comprise implementing a finishing process on the printed material, resulting in a second pattern configuration different from the first pattern configuration. One or more methods may comprise analyzing, using computer vision, the second pattern configuration disposed on the printed material. One or more methods may comprise determining, based on the first pattern configuration and the second pattern configuration, cutting control information. One or more methods may comprise sending the cutting control information to a cutting system to facilitate cutting of the printed material. The cutting system may comprise a high-speed single-ply galvanometer driven laser cutting system. The finishing process comprises steaming the material, washing the material, and/or drying the material. The finishing process may comprise a digital finishing processes. The cutting control information may be dependent upon a type of the material. One or more methods may comprise batching one or more customer orders into a batch and nesting a plurality of article components on the printed material based on the batch.

A method of cutting may comprise batching one or more customer orders into a batch, nesting a plurality of article components based on the batch, and cutting the nested components from a substrate such that one or more tabs connect the cut components to a portion of the substrate. Prior to the cutting step, a method may comprise analyzing, using computer vision, a first pattern configuration disposed on the substrate, implementing a finishing process on the substrate, resulting in a second pattern configuration different from the first pattern configuration, analyzing, using computer vision, the second pattern configuration disposed on the substrate, and determining, based on the first pattern configuration and the second pattern configuration, cutting control information. The cutting step may be implemented based at least on the cutting control information. The cutting step may implemented using a high-speed galvanometer driven laser cutting system to cut a single ply. The finishing process may comprise one or more of steaming the material, washing the material, or drying the material. The finishing process may comprise one or more of belt compacting, mechanical compacting, decatising, spongeing, sanforizing, relaxed drying, continuous tumbling, or batch tumbling. The finishing process may comprise one or more sueding, shearing, raising, open width compacting, tubular compacting, calendaring, vaporizing, spongeing, atmospheric plasma finishing, continuous cecatising, semi-continuous decatising, crabbing, coating, laminating, embossing, tensionless drying, relaxed drying, tentering, stentering, napping, brushing, singeing, beetling, heatsetting, thermofixing, fulling, digital printing, roller printing, scutching, sputtering, or Schreinering. The cutting control information may be dependent upon a material characteristic comprising one or more of a type of material, a thickness of material, a mass per unit area of material, a porosity of material, or a yarn characteristic.

Figure 14:
FIG. 14 illustrates an example process flow.

FIG. 14 shows an example diagram of a laser cutting process. At 1400, fabric may be observed. The fabric may be digitally printed fabric. The digitally printed fabric may comprise patterns. Robot vision may be used to capture pattern dimensions. The captured pattern dimensions may comprise original pattern dimensions. The captured pattern dimensions may comprise pre-finishing pattern dimensions.

At 1402, fabric finishing processes may be performed on the fabric. Fabric finishing processes may comprise steaming the fabric. The fabric may be steamed at the fixation/steaming step at 170 in FIG. 1. Fabric finishing processes may comprise washing the fabric. The fabric may be washed at the post-print washing step at 174 in FIG. 1. Fabric finishing processes may comprise drying the fabric. The fabric may be dried at the post-print drying step at 178 in FIG. 1. The fabric may undergo traditional and/or digital finishing processes. The fabric finishing processes may result the fabric comprising altered pattern dimensions.

At 1404, fabric changes may be observed. Robot vision may be used to capture pattern dimensions of the fabric after the fabric finishing processes. The captured pattern dimensions of the fabric after the fabric finishing processes may comprise the altered pattern dimensions. The captured pattern dimensions of the fabric after the fabric finishing processes may comprise post-finishing pattern dimensions. The altered pattern dimensions may be compared with the original pattern dimensions to obtain a delta (e.g., change, alteration, etc.). The delta may be provided to a laser control system. The laser control system may use the delta to more accurately and more precisely cut the patterns from the fabric.

Figure 15:
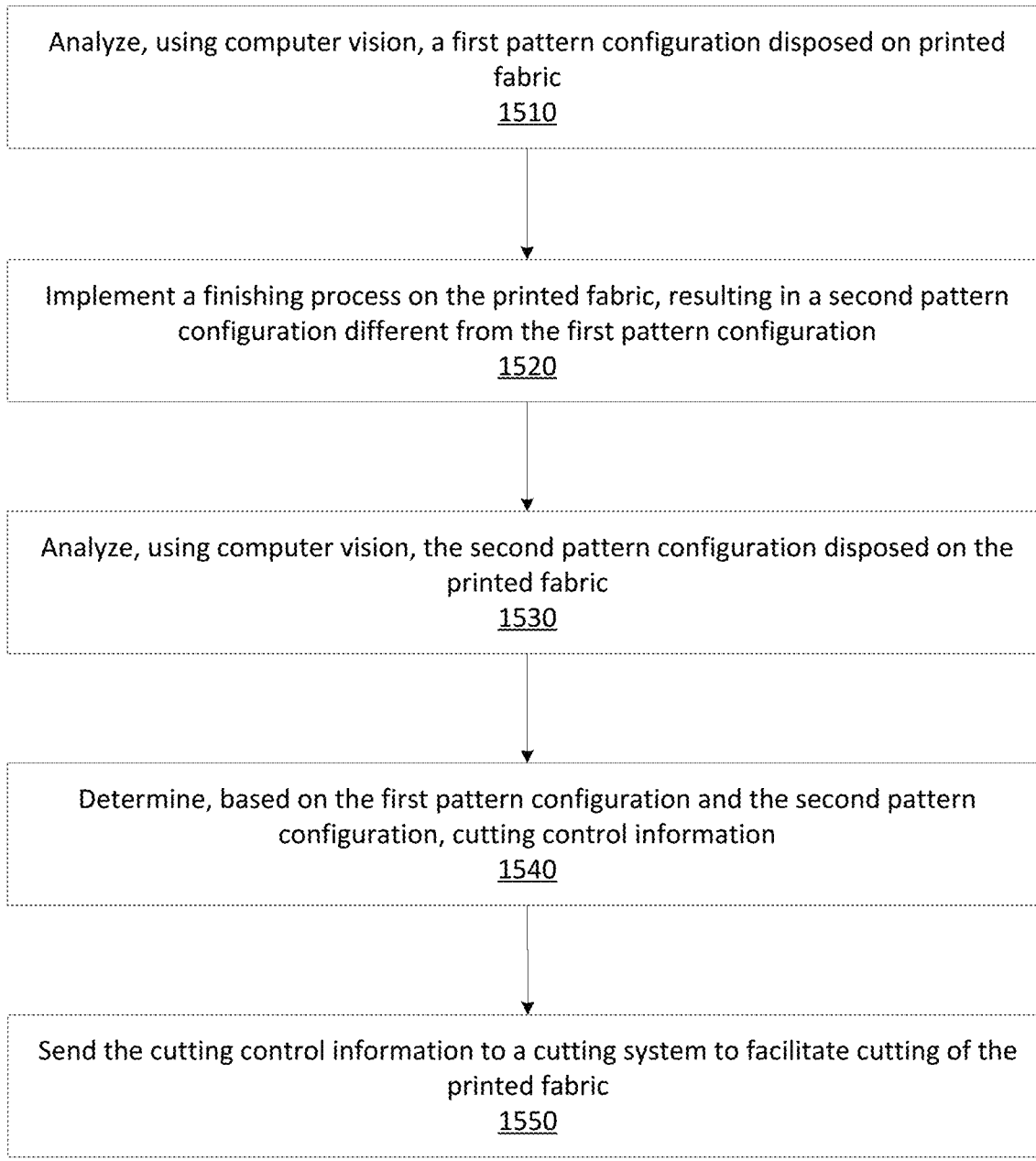
FIG. 15 is a flow diagram of an example method.

Referring to FIG. 15, a method for cutting registration is illustrated. At step 1510, a first pattern configuration disposed on printed fabric may be analyzed using computer vision. A materials manufacturer may analyze a first pattern configuration disposed on printed fabric using computer vision.

At step 1520, a finishing process may be implemented on the printed fabric, resulting in a second pattern configuration different from the first pattern configuration. A materials manufacturer may implement a finishing process on the printed fabric, resulting in a second pattern configuration different from the first pattern configuration.

At step 1530, the second pattern configuration disposed on the printed fabric may be analyzed using computer vision. A materials manufacturer may analyze the second pattern configuration disposed on the printed fabric using computer vision.

At step 1540, cutting control information may be determined based on the first pattern configuration and the second pattern configuration. A materials manufacturer may determine cutting control information based on the first pattern configuration and the second pattern configuration.

At step 1550, the cutting control information may be sent to a cutting system to facilitate cutting of the printed fabric. A materials manufacturer may send the cutting control information to a cutting system to facilitate cutting of the printed fabric.

A materials manufacturer may receive fabric with a printed design. The materials manufacturer may use computer vision to capture an original printed design on the fabric. The fabric may undergo a finishing process. The materials manufacturer may use computer vision to capture an altered printed design on the fabric. The materials manufacturer may use the original printed design and the altered printed design to determine a delta. The materials manufacturer may provide the delta to a cutting system. The cutting system may use the delta to cut the fabric with the altered printed design.

Material Handling

Traditional automation methods for handling and kitting functions within the textile and apparel industry are highly specialized to specific product applications. As traditional apparel and footwear assembly lines are capital intensive and product specific, high volume and throughput, with low labor costs, are needed to justify investments. This investment threshold is prohibitively steep for most businesses, generally preventing manufacturing operations within high-cost developed markets.

Figure 16:
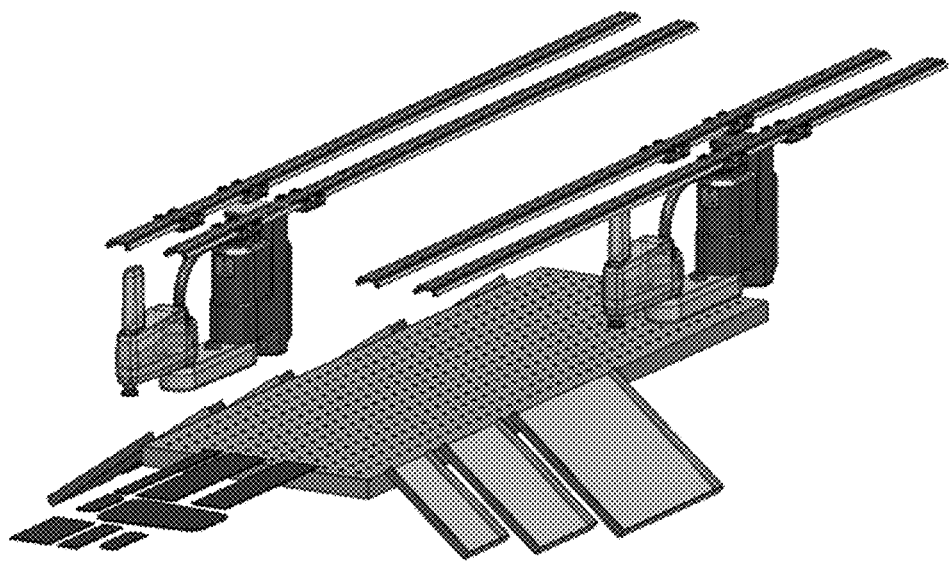
FIGS. 16-17 illustrate an example system.
Figure 17:
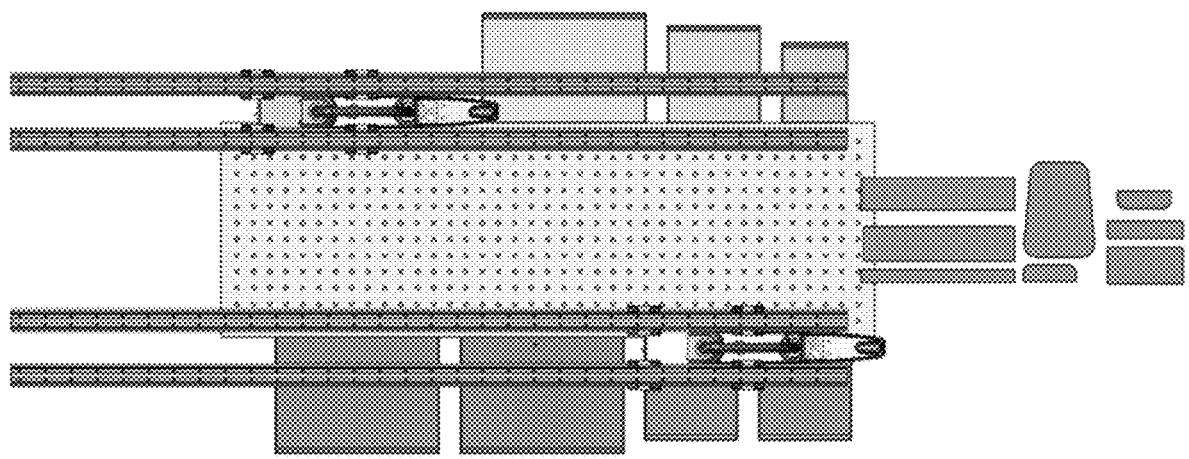

In the present disclosure, as illustrated in FIGS. 16-17, a design for automated kitting and assembly creates a flexible platform that can be reconfigured for different product types and categories as well as an ability to adjust to variances in respective throughput speeds and volume. For example, the pick & place robot types (e.g. SCARA vs delta) in variable concentrations and overlap radiuses through the use of an overhead rail system. Throughput speed/volume can be moderated through the use of a tray and sorting system that allows for pieces to be sorted dynamically, into either a stack of like components or as a batched order, in a way that simplifies the problem set to be navigated via vision recognition and minimized mechanical distance travelled. Other examples of platform agility can be found with interchangeable end effectors (electrostatic, water, vacuum, etc.) to account for substrate type, the conveyor expanded to manage larger cut components, and trays swapped for envelopes for the off-site assembly of custom orders elsewhere.

Conventional article management processes remain siloed and ring-fenced from printing, nesting, and batching considerations. This creates prohibitive cost inefficiencies when printing at component level in particular. The present disclosure may treat the end-to-end manufacturing value chain as a closed system and feedback loop.

Web Defect Tracking Method:

In the present system there may be multiple "subsystems" (printers, steamers, cutters, etc). Each one of the subsystems can produce a defect in certain instances. For example, one of the printers could misprint or the deposited inks could be smudged by coming in physical contact with an object. As another example, a steamer that is set to execute a wrong recipe could produce a segment, of the fabric roll, that is unusable. In another example, an operator may choose to cut out a segment of the roll fabric and then reconnect it (via stitching). Such alterations may be recorded and communicated to the designated subsystems so that, for example, the cutter is able to accurately and precisely cutout garment parts from a web and/or so that the mechanical arms know what parts to expect and where.

As such, a nesting program (e.g., after executing the nesting protocol) may deposit UIDs along the "gutter" region of the fabric roll. The UIDs may be scannable barcodes, data matrices, or equivalent, and are equally spaced along the long edges of the fabric. Other UIDs may be used. For example, one may create a unique identifier every 5 inches (with an identical copy of the UID contained within the other, parallel gutter); alternatively, these UIDs may be spaced in any other, regular fashion along the gutters. The space between each UID (virtual fabric slice) can be called a "segment" and will contain printed garment parts or graphical design(s). The nesting program may record the specific garment parts or graphical design(s) contained within each virtual segment (i.e. between two consecutive UIDs). Note that some of the parts in a particular segment will not be "whole" since portions of the parts will be contained in the segment immediately following or preceding the current segment.

As an illustrative example, when a defect is detected one of the following operations may be executed: 1) the operator cuts out the defective segment of the fabric, scans the two UIDs (one before the defect region and one immediately after the defect region), and reconnects the fabric. 2) no cutting of the fabric occurs. The operator (or a camera) scans the two UIDs that contain the defective region (which may span multiple segments). Other operations may be executed. The information from the scanned UIDs may be communicated to a computer system that makes proper adjustments to the main nesting file in order to exclude the cut segment in later operations (ex. cutting). Additionally or alternatively, the information about the parts (and/or graphical designs), that were contained within the defective region, may be stored. The stored information may be further appended with other defect data from other rolls of the same fabric material. At the end of the production process (or at any time) the stored information may be sent back to the nesting software which congregates and re-nests the "missing" parts. Once the parts are nested, the production process follows (i.e. printing, steaming, cutting, etc) until all required parts are produced. Alternatively or additionally, the same process as above may be implemented but with UIDs placed among the nested parts instead of being in the gutters.

The present disclosure comprises at least the following aspects:

Aspect 1: A method for article management, the method comprising: receiving consumer data comprising at least biometric information associated with one or more consumers; receiving design inputs indicative of a design of an article, wherein the design of the article is based on the consumer data; causing output of interactive content to a user interface associated with the one or more consumers, wherein the interactive content comprises at least a representation of the design of the article; and outputting manufacturing data indicative of instructions associated with manufacture of the article, wherein the instructions are based on the design of the article.

Aspect 2: The method of aspect 1, wherein the consumer data further comprises consumer preference information.

Aspect 3: The method of aspect 1, further comprising receiving coloration data indicative of a coloration feasibility, wherein the design of the article is dependent on the coloration data.

Aspect 4: The method of aspect 1, wherein the outputting manufacturing data comprises outputting, to a digital print system, at least a portion of the manufacturing data.

Aspect 5: A method for direct-to-manufacturer article management, the method comprising: receiving consumer data comprising at least biometric information associated with one or more consumers; receiving design inputs indicative of a design of an article, wherein the design of the article is based on the consumer data; automatically generating a pattern comprising one or more components of the article and one or more components of a second article; and outputting manufacturing data indicative of instructions associated with manufacture of the article, wherein the instructions are based on the pattern.

Aspect 6: The method of aspect 1, wherein the automatically generating a pattern comprises executing nesting optimization.

Aspect 7: A method for article development, the method comprising: receiving consumer data comprising at least biometric information associated with one or ore consumers; receiving trend data indicative of a trend in one or more of article design or article coloration; causing output of, based on at least the consumer data and the trend data and via a user interface, one or more design options; and receiving design inputs indicative of a design of an article.

Aspect 8: The method of aspect 7, wherein the consumer data further comprises consumer preference information.

Aspect 9: The method of aspect 7, wherein the one or more design options comprise types of fabrics.

Aspect 10: The method of aspect 7, wherein the one or more design options are limited based on available fabrics.

Aspect 11: The method of aspect 7, further comprising generating a tech pack based on the design of the article and a fabric selection.

Aspect 12: The method of aspect 7, further comprising outputting a bill if material based on the design of the fabric.

Aspect 13: A method for color control, the method comprising: receiving data indicative of one or more characteristics of a substrate for use in forming an article; selecting, based on the data indicative of one or more characteristics of the substrate, a chemical profile or a finishing process, or both; and forming at least a portion of the article using the selected chemical profile or finishing process, or both.

Aspect 14: The method of aspect 13, wherein the article exhibits a color that is within tolerance of a design color.

Aspect 15: A method of color control, the method comprising: performing a first process of a plurality of article management processes to output a first stage article; capturing, using an inline spectrophotometer, color data associated with the first stage product; comparing the color data to expected data; and executing a remediation based at least on the comparing the color data to expected data.

Aspect 16: A method of pretreating textile, the method comprising: receiving a textile; determining a select area of the textile that is to be printed; causing an applicator to apply a foam chemistry to the select area of the textile, wherein application of the foam chemistry to areas of the textile outside the select area is minimized; and drying the select area of the textile such that a surface of the select area is capable of being printed.

Aspect 17: A method of pretreating textile, the method comprising: receiving a textile; conditioning, using a plasma, at least a portion of the textile to remove one or more contaminants from at least the portion of the textile, and changing one or more of a surface chemistry and a topography of at least the portion of the textile; and applying one or more chemistries to at least the portion of the textile.

Aspect 18: The method of aspect 17, wherein the conditioning at least the portion of the textile further activates a surface of the textile, and wherein activation of the surface of the textile improves a performance of the one or more chemistries as compared to an unactivated surface of the textile with the same one or more chemistries applied thereto.

Aspect 19: A method for attribution and/or traceability, the method comprising disposing one or more unique identifiers on at least a portion of an article, wherein the one or more unique identifiers are invisible to a human eye and visible with the aid of a predetermined vision method, and wherein the one or more unique identifiers are referenced during a manufacturing process comprising digital printing to provide quality control data for one or more steps in the manufacturing process.

Aspect 20: The method of aspect 19, wherein the one or more unique identifiers indicate a registration mechanism for one or more components of the article.

Aspect 21: A method for attribution and/or traceability, the method comprising disposing one or more unique identifiers on an article, wherein the one or more unique identifiers comprise an invisible component that is invisible to a human eye and visible with the aid of a predetermined vision method and a visible component that is visible to the human eye, and wherein the one or more unique identifiers indicate at least attribution data.

Aspect 22: The method of aspect 21, wherein the attribution data comprises information indicative of the provenance of the article.

Aspect 23: A method for component-level application, the method comprising: receiving information indicating locations for application of a material on a surface of an article; and selectively disposing, using digital printing or digital extrusion and based on the locations, the material only at the locations, whereby the material is not disposed on at least a portion of the article.

Aspect 24: The method of aspect 23, wherein the material comprises an adhesive.

Aspect 25: The method of aspect 23, wherein the selectively disposing is based on registration points associated with the article.

Aspect 26: A method for cutting registration, the method comprising: analyzing, using computer vision, a first pattern configuration disposed on printed fabric; implementing a finishing process on the printed fabric, resulting in a second pattern configuration different from the first pattern configuration; analyzing, using computer vision, the second pattern configuration disposed on the printed fabric; determining, based on the first pattern configuration and the second pattern configuration, cutting control information; and sending the cutting control information to a cutting system to facilitate cutting of the printed fabric.

Aspect 27: A method of cutting comprising: batching one or more customer orders into a batch; nesting a plurality of article components based on the batch; and cutting the nested components from a substrate such that one or more tabs connect the cut components to a portion of the substrate.

Aspect 28: A method of material handling comprising: arranging a tray and sorting system with an overhead rail system configured for material handling; receiving a plurality of material components; sorting, using the arranged tray and sorting system and the overhead rail system, the plurality of material components based on one or more of a type of component or a batched order, or both.

Aspect 29: A system for implementing any one of the methods of aspects 1-28.

What is claimed is:

1. A method for cutting registration of component patterns, the method comprising:
    batching one or more customer orders into a batch;
    nesting a plurality of component patterns of one or more articles based on the batch;
    analyzing, using computer vision, a first pattern configuration of a component pattern of the plurality of component patterns disposed on printed textile material, the component pattern comprising a template of at least a portion of a component of an article, wherein the printed textile material comprises a fabric;
    implementing a finishing process on the printed textile material, resulting in a second pattern configuration of the component pattern different from the first pattern configuration;
    analyzing, using computer vision, the second pattern configuration disposed on the printed textile material;
    determining, based on analyzing the first pattern configuration and the second pattern configuration, cutting control information, wherein the cutting control information is dependent upon a difference between the second pattern configuration and the first pattern configuration, and wherein the difference between the second pattern configuration and the first pattern configuration is at least in part due to a bow distortion, a skew distortion, or both, in response to at least the finishing process;
    sending the cutting control information to a cutting system to facilitate cutting of the printed textile material; and
    causing, using the cutting system, the printed textile material to be cut based on the cutting control information.

2. A system configured to implement the method of claim 1, wherein the system comprises a textile laser cutter, a computer network, a vision system, and one or more of a textile printer and a textile pick-and-place unit.

3. A method for cutting registration, the method comprising:
    batching one or more customer orders into a batch;
    nesting a plurality of component patterns of one or more articles based on the batch;
    analyzing, using computer vision, a first pattern configuration of a component pattern of the plurality of component patterns disposed on printed textile material, the component pattern comprising a template of at least a portion of a component of an article, wherein the printed textile material comprises a fabric; implementing a finishing process on the printed textile material, resulting in a second pattern configuration different from the first pattern configuration;
    analyzing, using computer vision, the second pattern configuration disposed on the printed textile material;
    determining, based on analyzing the first pattern configuration and the second pattern configuration, cutting control information, wherein the cutting control information is based on a difference between the second pattern configuration and the first pattern configuration, and wherein the difference between the second pattern configuration and the first pattern configuration is at least in part due to one or more of a bow distortion, a skew distortion, or a nonlinear distortion, in response to at least the finishing process;
    sending the cutting control information to a cutting system to facilitate cutting of the printed textile material.

4. The method of claim 3, wherein the cutting system comprises a high-speed single-ply galvanometer driven laser cutting system.

5. The method of claim 3, wherein the finishing process comprises steaming the material.

6. The method of claim 3, wherein the finishing process comprises washing the material.

7. The method of claim 3, wherein the finishing process comprises drying the material.

8. The method of claim 3, wherein the finishing process comprises a digital finishing process.

9. The method of claim 3, further comprising batching one or more customer orders into a batch and nesting a plurality of article components on the printed textile material based on the batch, wherein the nesting minimizes waste material.

10. An article formed using the method of claim 3.

11. A method of cutting comprising:
    analyzing, using computer vision, a first pattern configuration of a component pattern disposed on a substrate, the component pattern comprising a template of at least a portion of a component of a plurality of article components;

implementing a finishing process on the substrate, resulting in a second pattern configuration different from the first pattern configuration;

analyzing, using computer vision, the second pattern configuration disposed on the substrate;

determining, based on the first pattern configuration and the second pattern configuration, cutting control information wherein the cutting control information is based on a difference between the second pattern configuration and the first pattern configuration, and wherein the difference between the second pattern configuration and the first pattern configuration is at least in part due to one or more of a bow distortion, a skew distortion, or a non-linear distortion, in response to at least the finishing process;

batching one or more customer orders into a batch;

nesting the plurality of article components based on the batch; and cutting the nested components from the substrate such that one or more tabs connect the cut components to a portion of the substrate.

12. The method of claim 11, wherein the finishing process comprises one or more of steaming the material, washing the material, or drying the material.

13. The method of claim 11, wherein the finishing process comprises one or more of belt compacting, mechanical compacting, decatising, sponging, sanforizing, relaxed drying, continuous tumbling, or batch tumbling.

14. The method of claim 11, wherein the finishing process comprises one or more of sueding, shearing, raising, open width compacting, tubular compacting, calendaring, vaporizing, sponging, atmospheric plasma finishing, continuous decasting, semi-continuous decatising, crabbing, coating, laminating, embossing, tensionless drying, relaxed drying, tentering, stentering, napping, brushing, singeing, beetling, heatsetting, thermofixing, fulling, digital printing, roller printing, scutching, sputtering, or Schreinering.

15. An article formed using the method of claim 11.

16. A system configured to implement the method of claim 11, wherein the system comprises a textile laser cutter, a computer network, a vision system, and one or more of a textile printer and a textile pick-and-place unit.

17. An article formed using the method of claim 3, wherein the article comprises one or more of apparel, footwear, or bags.

* * * * *